(12) United States Patent
Jungmaier et al.

(10) Patent No.: US 11,204,411 B2
(45) Date of Patent: Dec. 21, 2021

(54) RADAR SYSTEMS AND METHODS OF OPERATION THEREOF

(71) Applicant: Infineon Technologies AG, Neubiberg (DE)

(72) Inventors: Reinhard-Wolfgang Jungmaier, Aying (DE); Saverio Trotta, Munich (DE); Ashutosh Baheti, Munich (DE); Jagjit Singh Bal, Fremont, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 338 days.

(21) Appl. No.: 15/897,632

(22) Filed: Feb. 15, 2018

(65) Prior Publication Data

US 2018/0372844 A1 Dec. 27, 2018

Related U.S. Application Data

(60) Provisional application No. 62/523,626, filed on Jun. 22, 2017.

(51) Int. Cl.
*G01S 7/41* (2006.01)
*G01S 7/35* (2006.01)
(Continued)

(52) U.S. Cl.
CPC ............... *G01S 7/41* (2013.01); *G01S 7/032* (2013.01); *G01S 7/352* (2013.01); *G01S 7/415* (2013.01);
(Continued)

(58) Field of Classification Search
CPC ........ G01S 13/931; G01S 7/032; G01S 13/87; G01S 13/42; G01S 7/03; G01S 2013/93271; G01S 7/006; G01S 13/04; G01S 13/75; G01S 13/88; G01S 7/352; G01S 1/2283; G01S 1/243; G01S 13/0209; G01S 2013/0245; G01S 7/282; G01S 7/027;
(Continued)

(56) References Cited

U.S. PATENT DOCUMENTS 5,291,211 A 3/1994 Tropper
6,750,810 B2 * 6/2004 Shinoda ............... H01Q 3/2605
342/149

(Continued)

FOREIGN PATENT DOCUMENTS

CN 102570014 A 7/2012
CN 103187633 A 7/2013
(Continued)

*Primary Examiner* — Olumide Ajibade Akonai
(74) *Attorney, Agent, or Firm* — Slater Matsil, LLP

(57) ABSTRACT

A method of operating a radar system includes transmitting a plurality of transmitted radio frequency (RF) signals by a plurality of directional antennas. The plurality of directional antennas is disposed on a planar surface of a substrate. Each of the plurality of antennas is in a fixed orientation and position on the planar surface. A respective individual coverage of each of the plurality of directional antennas is less than 360°. A combined coverage of the plurality of transmitted RF signals completely covers a 360° region surrounding the radar system. The method also includes receiving a reflected RF signal by a directional antenna of the plurality of directional antennas.

19 Claims, 16 Drawing Sheets

(51) Int. Cl.
    *G01S 13/06* (2006.01)
    *G01S 13/88* (2006.01)
    *G01S 7/03* (2006.01)
    *G01S 13/87* (2006.01)
    *G01S 13/02* (2006.01)
    *G01S 13/34* (2006.01)
    *G01S 7/02* (2006.01)

(52) U.S. Cl.
    CPC ............ *G01S 13/06* (2013.01); *G01S 13/878* (2013.01); *G01S 13/88* (2013.01); *G01S 7/028* (2021.05); *G01S 13/34* (2013.01); *G01S 2013/0245* (2013.01)

(58) Field of Classification Search
    CPC .. H01Q 1/3233; H01Q 13/085; H01Q 21/065; H01Q 9/0407; H01Q 1/38; H01Q 21/06; H01Q 21/061; H01Q 21/064; H01Q 21/067; H01Q 25/00; H01Q 3/24; H01Q 13/02; H01Q 3/242; H01Q 1/2283; H01Q 1/40; H01Q 1/526; H01Q 13/10; H01Q 13/18; H01Q 21/205; H01Q 23/00; H01L 2223/6677; H01L 2924/3025; H04B 1/04
    See application file for complete search history.

(56) References Cited

U.S. PATENT DOCUMENTS

| | | | | |
|---|---|---|---|---|
| 9,356,353 | B1* | 5/2016 | Manry, Jr. | H01Q 9/0435 |
| 2003/0169134 | A1* | 9/2003 | Ammar | H01L 24/49 |
| | | | | 333/247 |
| 2005/0219126 | A1* | 10/2005 | Rebeiz | H01Q 3/242 |
| | | | | 343/700 MS |
| 2007/0001897 | A1* | 1/2007 | Alland | G01S 7/352 |
| | | | | 342/70 |
| 2007/0195004 | A1* | 8/2007 | Rebeiz | H01Q 1/3233 |
| | | | | 343/876 |
| 2007/0296640 | A1* | 12/2007 | Colburn | H01Q 19/062 |
| | | | | 343/783 |
| 2008/0048921 | A1* | 2/2008 | Rebeiz | H01Q 1/3233 |
| | | | | 343/754 |
| 2009/0231225 | A1* | 9/2009 | Choudhury | H01Q 3/26 |
| | | | | 343/770 |
| 2009/0251362 | A1* | 10/2009 | Margomenos | G01S 13/931 |
| | | | | 342/175 |
| 2009/0267822 | A1* | 10/2009 | Shinoda | G01S 7/352 |
| | | | | 342/70 |
| 2010/0066590 | A1* | 3/2010 | Brown | G01S 7/03 |
| | | | | 342/147 |
| 2012/0019423 | A1* | 1/2012 | Schultheiss | H01Q 1/42 |
| | | | | 343/753 |
| 2015/0070228 | A1* | 3/2015 | Gu | H01Q 1/2283 |
| | | | | 343/727 |
| 2015/0241552 | A1* | 8/2015 | Mohamadi | A61B 5/0507 |
| | | | | 342/175 |
| 2016/0125713 | A1* | 5/2016 | Blech | G08B 13/187 |
| | | | | 348/143 |
| 2016/0181695 | A1* | 6/2016 | Mukherjee | H01Q 1/2216 |
| | | | | 343/866 |
| 2016/0259037 | A1* | 9/2016 | Molchanov | G06K 9/78 |
| 2016/0276727 | A1* | 9/2016 | Dang | H01Q 1/38 |
| 2017/0045613 | A1 | 2/2017 | Wang | |
| 2017/0234971 | A1* | 8/2017 | Arai | H04L 5/0048 |
| | | | | 342/174 |
| 2018/0090827 | A1* | 3/2018 | Lee | G01S 7/032 |
| 2018/0136327 | A1* | 5/2018 | Lee | G01S 7/032 |
| 2019/0113601 | A1 | 4/2019 | Trotta et al. | |

FOREIGN PATENT DOCUMENTS

| | | |
|---|---|---|
| CN | 103326133 A | 9/2013 |
| CN | 203589185 U | 5/2014 |
| CN | 105717504 A | 6/2016 |
| CN | 105720352 A | 6/2016 |
| CN | 106338728 A | 1/2017 |
| EP | 0966060 A1 | 12/1999 |
| JP | 2007049691 A * | 2/2007 |

* cited by examiner

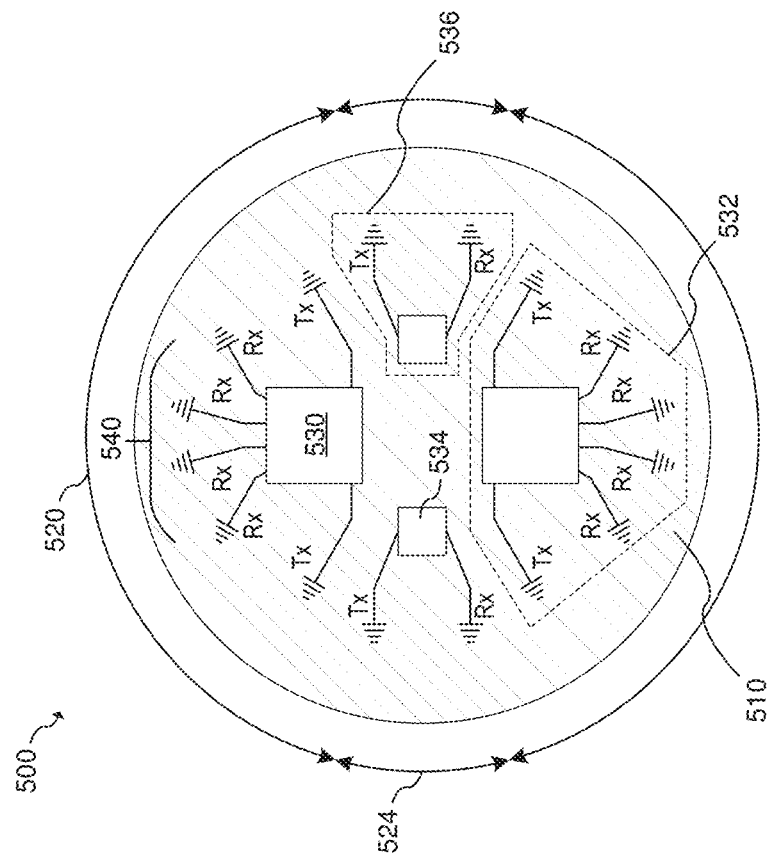
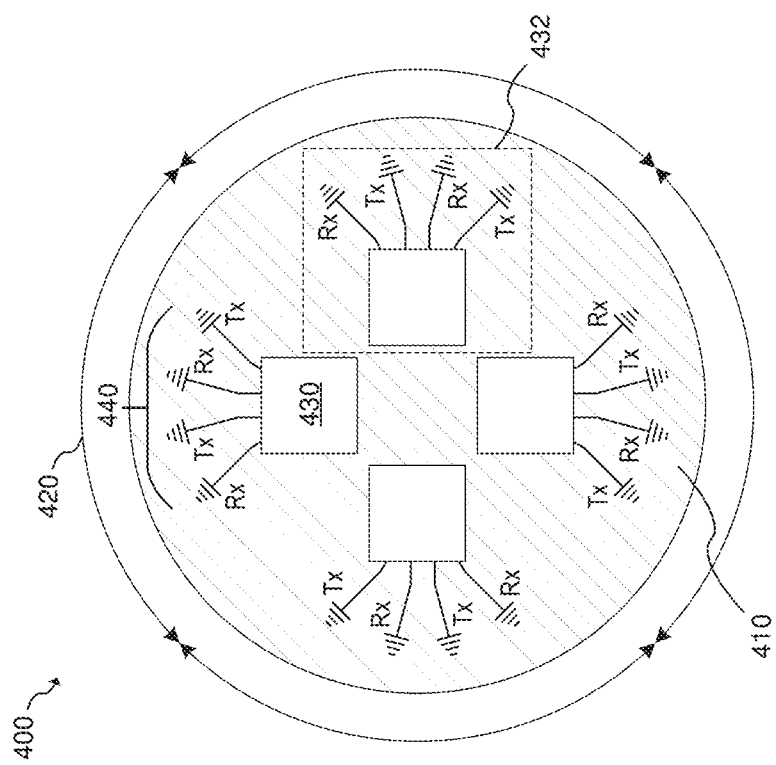
Fig. 5
Fig. 4

RADAR SYSTEMS AND METHODS OF OPERATION THEREOF

This application claims benefit of U.S. Provisional Application No. 62/523,626, filed on Jun. 22, 2017, which application is hereby incorporated herein by reference in its entirety.

TECHNICAL FIELD

The present invention relates generally to a radar system, and, in particular embodiments, to radar system structures and the methods of operation thereof.

BACKGROUND

Portable devices such as tablets, smart phones, and smart watches have become popular recently due to the rapid advancement in low-cost semiconductor technologies. Portable devices may utilize multiple antenna elements for beamforming, transmit diversity and MIMO configurations, and as radar sensors that can detect user motions (known as gesture sensors). Gesture sensors may be configured in a portable device as an interface to control functionality of the device.

Directional antennas and antenna systems may allow directional transmission of radio signals as well as spatial resolution of received radio frequency signals. The field of view for a radar system may define a region where the radar system may transmit and receive radio frequency signals. A large field of view for a radar system in a portable device may be desirable in many applications.

SUMMARY

In accordance with an embodiment of the invention, a method of operating a radar system includes transmitting a plurality of transmitted radio frequency (RF) signals by a plurality of directional antennas. The plurality of directional antennas is disposed on a planar surface of a substrate. Each of the plurality of antennas is in a fixed orientation and position on the planar surface. A respective individual coverage of each of the plurality of directional antennas is less than 360°. A combined coverage of the plurality of transmitted RF signals completely covers a 360° region surrounding the radar system. The method also includes receiving a reflected RF signal by a directional antenna of the plurality of directional antennas.

In accordance with another embodiment of the invention, a radar system includes a substrate including a planar surface. The radar system further includes a plurality of directional antennas disposed on the planar surface. The plurality of directional antennas is configured to transmit a plurality of transmitted radio frequency (RF) signals and receive a reflected RF signal. Each of the plurality of directional antennas is in a fixed orientation and position on the planar surface. A respective individual coverage of each of the plurality of directional antennas is less than 360°. A combined coverage of the plurality of transmitted RF signals completely covers a 360° region surrounding the radar system.

In accordance with still another embodiment of the invention, a radar system includes a support structure and a plurality of directional antennas disposed in fixed orientations and positions on outer surfaces of the support structure. The plurality of directional antennas is configured to transmit a plurality of transmitted radio frequency (RF) signals and receive a reflected RF signal. Each of the plurality of directional antennas comprises a broadside radiation pattern. A respective individual coverage of each of the plurality of directional antennas is less than 360°. A combined coverage of the plurality of a combined coverage of the plurality of transmitted RF signals completely covers a 360° region surrounding the radar system.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates an example gesture recognition application in which a smartwatch is controlled using various hand gestures, FIG. 1B illustrates various example hand gestures that may be used to control a smartwatch, FIG. 1C illustrates a block diagram of a gesture recognition system that includes a radar front end circuit and processing circuitry, and FIG. 1D illustrates a plan view of a gesture recognition circuit that includes a radar front end circuit implemented as a radio frequency integrated circuit;

FIG. 4 illustrates an example radar system that has a plurality of radar subsystems each including a plurality of directional antennas disposed on a planar surface of a substrate where the radar system has a 360° combined field of view in accordance with an embodiment of the invention;

FIG. 5 illustrates an example radar system that has a plurality of radar subsystems each including a plurality of directional antennas disposed on a planar surface of a substrate where the radar system has a 360° combined field of view in accordance with an embodiment of the invention;

FIG. 6A illustrates a top view the radar system, and FIG. 6B illustrates a side view of the radar system;

FIG. 7A illustrates the substrate, FIG. 7B illustrates the substrate and the conductive plate, and FIG. 7C illustrates the substrate, conductive plate, and the digital media module;

FIG. 8A illustrates the substrate, FIG. 8B illustrates the substrate and the conductive plate, and FIG. 8C illustrates the substrate, conductive plate, and the digital media module;

FIG. 10A illustrates the substrate, FIG. 10B illustrates the substrate and the conductive plate that has an opening, and FIG. 10C illustrates the substrate, conductive plate, and the digital media module;

FIG. 12A illustrates a top view of an example radar system that has four radar subsystems disposed on a curved surface of a cylindrical molded substrate, FIG. 12B illustrates a top view of another example radar system that has four radar subsystems disposed on a curved surface of a cylindrical molded substrate and an additional radar subsystem disposed on a planar surface of the cylindrical molded substrate, FIG. 12C illustrates still another example radar subsystem that has five radar subsystems disposed on a curved surface of a cylindrical molded substrate, and FIG. 12D illustrates yet another example radar system that has six radar subsystems disposed on a curved surface of a cylindrical molded substrate;

FIG. 13A illustrates an isometric view of the radar system, and FIG. 13B illustrates a top view of the radar system;

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

In various embodiments, a radar-based gesture detection system is used to directly control a device such as a computer, a smartphone, or a tablet computer, or to control a remote device such as a vehicle, an electronic system within a building, or a home appliance. For example, when the remote device is a car, an embodiment gesture detection system allows a human actor to control various operations of the car from outside the car.

Figure 1A:
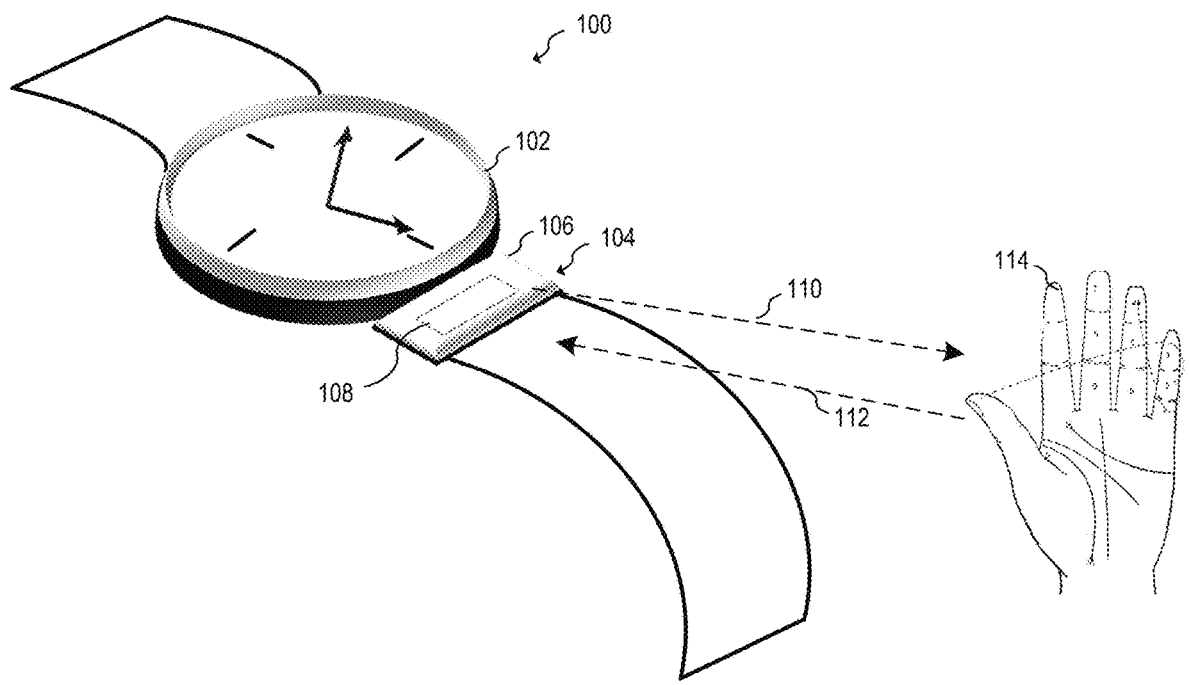
FIGS. 1A-1D illustrate an example gesture recognition system in accordance with an embodiment of the invention.

FIG. 1A illustrates an example gesture recognition application in which a smartwatch 100 is controlled using various hand gestures. As shown, smartwatch 100 includes a display element 102 physically coupled to a gesture recognition radar system 104. During operation, gesture recognition radar system 104 transmits RF signals no to target 114, which may be a human hand, and receives reflected RF signals 112 that are reflected by target 114. These reflected RF signals 112 are processed by the gesture recognition system to determine the position and motion of target 114 and/or to determine whether target 114 is providing a particular gesture. In some embodiments, gesture recognition radar system 104 may include a gesture recognition circuit 108 that is disposed within a housing 106. At least a portion of housing 106 is transparent or partially transparent to RF signals transmitted and received by gesture recognition circuit 108. It should be appreciated that gesture recognition circuit 108 may also be disposed within the body of display element 102.

In alternative embodiments, gesture recognition circuit 108 may be embedded within other devices including, but not limited to, car keys, smart phones, tablet computers, audio/visual equipment, kitchen appliances, HVAC controls, and automobiles. In some applications, such as automotive applications, gesture recognition circuit 108 may be embedded within a mobile device such as a car key or smart phone, which in turn communicates with a remote device to be controlled, such as an automobile or kitchen appliance. The data transfer between the mobile device and remote device could include any of a wide variety of communications technologies, including, e.g., Bluetooth, V2X, etc.

Figure 1B:
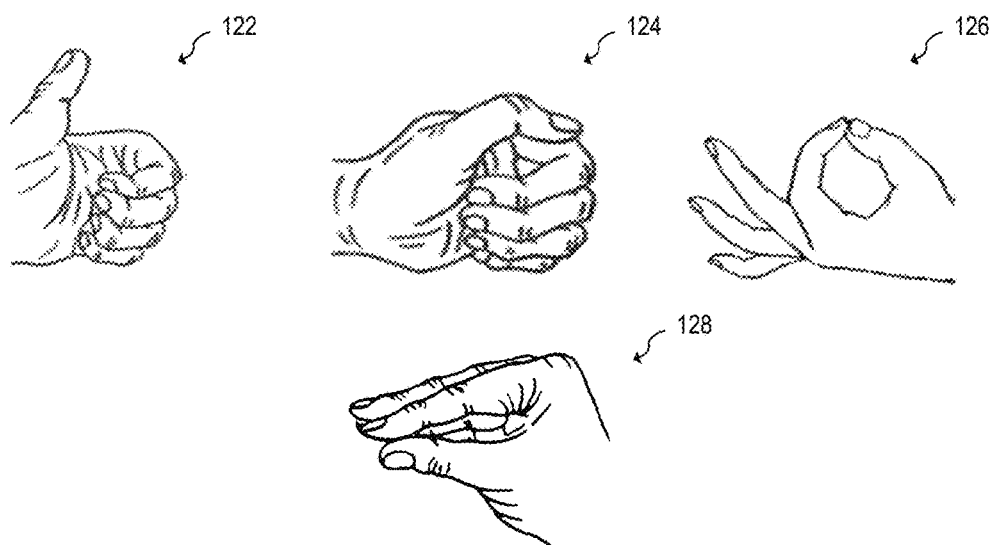

Example hand gestures shown in FIG. 1B may include, for example, a "thumbs-up" gesture 122, a "closed fist"

gesture 124, a "thumb-to-finger" gesture 126, or a "button press" gesture 128. Each of these example gestures could be used to control the functionality of smartwatch 100 or some other device or system. For example, "thumbs-up" gesture 122 could be used to open a smartwatch application, "closed fist" gesture 124 could be used to close the smartwatch application, "thumb-to-finger" gesture 126 in conjunction with motion between the thumb and index finger may be used to virtually rotate the hands on the clock display of smartwatch 100, and "button press" gesture 128 could be used to start and stop a stopwatch feature of smartwatch 100. In various embodiments, recognized gestures may be static or dynamic. Static gestures may be made by holding a hand in a fixed position such as the gestures 122, 124 and 128, and dynamic gestures may be made by moving the hand or a portion of the hand, such as moving the index finger with respect to the thumb such as with gesture 126. It should be understood that the above-mentioned gestures are just a few examples of many possible gestures that may be recognized by embodiment gesture recognition systems.

Figure 1C:
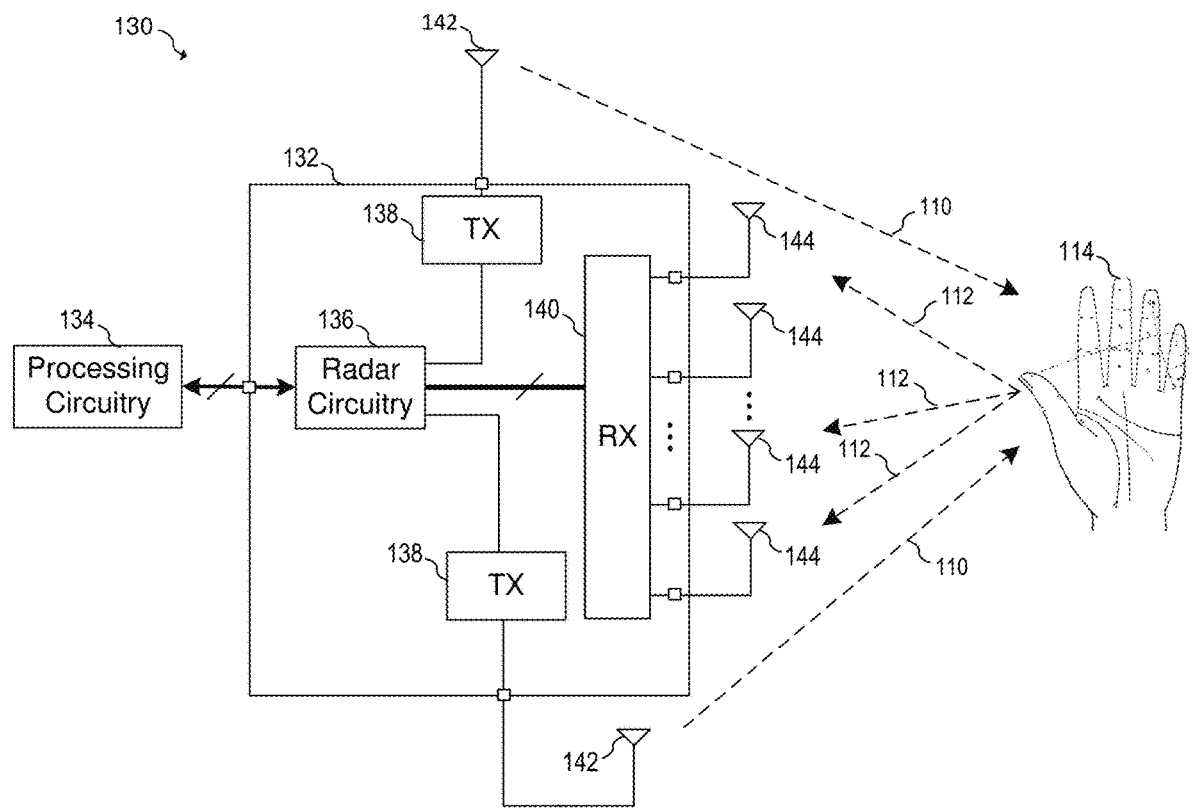

FIG. 1C illustrates a block diagram of gesture recognition system 130 that includes radar front-end circuit 132 and processing circuitry 134. During operation, positions and gestures of target 114 may be detected by the gesture recognition system 130. For example, a gesture of two fingers tapping each other could be interpreted as a "button press," or a gesture of a rotating thumb and finger may be interpreted as turning a dial. While target 114 is depicted in FIG. 1C as being a hand, gesture recognition system 130 may also be configured to determine gestures and positions of other types of targets such as a human body, machinery and other types of animate or inanimate objects. Gesture recognition system 130 may be implemented, for example, using a two-dimensional mm-wave phase-array radar that measures the position and relative speed of target 114. The mm-wave phase-array radar transmits and receives signals in the 50 GHz to 80 GHz range. Alternatively, frequencies outside of this range may also be used. In some embodiments, radar front-end circuit 132 operates as a frequency modulated continuous wave (FMCW) radar sensor having multiple transmit and receive channels.

Radar front-end circuit 132 transmits and receives radio signals for detecting target 114 in three-dimensional space. For example, radar front-end circuit 132 transmits an incident RF signal and receives a RF signal that is a reflection of the incident RF signal from target 114. The received reflected RF signal is downconverted by radar front-end circuit 132 to determine beat frequency signals. These beat frequency signals may be used to determine information such as the location, speed, angle, etc., of target 114 in three-dimensional space.

In various embodiments, radar front-end circuit 132 is configured to transmit incident RF signals toward target 114 via transmit antennas 142 and to receive reflected RF signals from target 114 via receive antennas 144. Radar front-end circuit 132 includes transmitter front-end circuits 138 coupled to transmit antennas 142 and receiver front-end circuit 140 coupled to receive antennas 144.

During operation, transmitter front-end circuits 138 may transmit RF signals toward target 114 one at a time or simultaneously. While two transmitter front-end circuits 138 are depicted in FIG. 1C, it should be appreciated that radar front-end circuit 132 may include fewer or greater than two transmitter front-end circuits 138. Each transmitter front-end circuit 138 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 140 receives and processes the reflected RF signals from target 114. As shown in FIG. 1C, receiver front-end circuit 140 is configured to be coupled to four receive antennas 144, which may be configured as a 2×2 antenna array. In alternative embodiments, receiver front-end circuit 140 may be configured to be coupled to greater or fewer than four antennas, with the resulting antenna array being of various n×m dimensions depending on the specific embodiment and its specifications. Receiver front-end circuit 140 may include, for example, RF oscillators, upconverting mixers, RF amplifiers, variable gain amplifiers, filters, transformers, power combiners and other types of circuits.

Radar circuitry 136 provides signals to be transmitted to transmitter front-end circuits 138, receives signals from receiver front-end circuit 140, and may be configured to control the operation of radar front-end circuit 132. In some embodiments, radar circuitry 136 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 136 may receive a baseband radar signal from processing circuitry 134 and control a frequency of an RF oscillator based on the received baseband signal. In some embodiments, this received baseband signal may represent a FMCW frequency chip to be transmitted. Radar circuitry 136 may adjust the frequency of the RF oscillator by applying a signal proportional to the received baseband signal to a frequency control input of a phase locked loop. Alternatively, the baseband signal received from processing circuitry 134 may be upconverted using one or more mixers. Radar circuitry 136 may transmit and digitize baseband signals via a digital bus (e.g., a USB bus), transmit and receive analog signals via an analog signal path, and/or transmit and/or receive a combination of analog and digital signals to and from processing circuitry 134.

Processing circuitry 134 acquires baseband signals provided by radar circuitry 136 and performs one or more signal processing steps to evaluate them. In an embodiment, processing circuitry 134 acquires a baseband signal that represents the beat frequency signals. The signal processing steps may include performing a fast Fourier transform (FFT), a short-time Fourier transform (STFT), target classification, machine learning, and the like. Results of the signal processing steps are used to determine and perform an action on the device, such as smartwatch 100 of FIG. 1A. In addition to processing the acquired baseband signals, processing circuitry 134 may also control aspects of radar front-end circuit 132, such as the transmissions produced by radar front-end circuit 132.

The various components of gesture recognition system 130 may be partitioned in various ways. For example, radar front-end circuit 132 may be implemented on one or more RF integrated circuits (RFICs), antennas 142 and 144 may be disposed on a circuit board, and processing circuitry 134 may be implemented using a processor, a microprocessor, a digital signal processor and/or a custom logic circuit disposed on one or more integrated circuits/semiconductor substrates. Processing circuitry 134 may include a processor that executes instructions stored in a non-transitory memory to perform the functions of processing circuitry 134. In some embodiments, however, all or part of the functionality of processing circuitry 134 may be incorporated on the same integrated circuit/semiconductor substrate on which radar front-end circuit 132 is disposed.

In some embodiments, some or all portions of radar front-end circuit 132 may be implemented in a package that contains transmit antennas 142, receive antennas 144, transmitter front-end circuits 138, receiver front-end circuit 140, and/or radar circuitry 136. In some embodiments, radar front-end circuit 132 may be implemented as one or more integrated circuits disposed on a circuit board, and transmit antennas 142 and receive antennas 144 may be implemented on the circuit board adjacent to the integrated circuits. In some embodiments, transmitter front-end circuits 138, receiver front-end circuit 140, and radar circuitry 136 are formed on a same radar front-end integrated circuit (IC) die. Transmit antennas 142 and receive antennas 144 may be part of the radar front-end IC die, or may be separate antennas over or adjacent to the radar front-end IC die. The radar front-end IC die may further include conductive layers, such as redistribution layers (RDLs), used for routing and/or for the implementation of various passive or active devices of radar front-end circuit 132. In an embodiment, transmit antennas 142 and receive antennas 144 may be implemented using the RDLs of the radar front-end IC die.

Figure 1D:
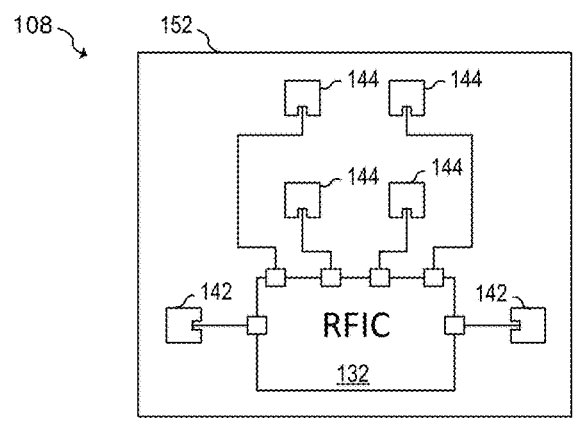

FIG. 1D illustrates a plan view of gesture recognition circuit 108 that includes radar front-end circuit 132 implemented as an RFIC coupled to transmit antennas 142 and receive antennas 144 implemented as patch antennas disposed on or within substrate 152. In some embodiments, substrate 152 may be implemented using a circuit board on which radar front-end circuit 132 is disposed and on which transmit antennas 142 and receive antennas 144 are implemented using conductive layers of the circuit board. Alternatively, substrate 152 represents a wafer substrate on which one or more RDLs are disposed and on which transmit antennas 142 and receive antennas 144 are implemented using conductive layers on the one or more RDLs. It should be appreciated that the implementation of FIG. 1D is just one of many ways that embodiment gesture recognition systems may be implemented.

In various embodiments, a radar system with a 360° combined field of view is implemented using a plurality of radar subsystems. Each of the plurality of radar subsystems has a field of view that is less than 360° and includes a plurality of directional antennas. The plurality of radar subsystems and respective directional antennas are disposed in a fixed orientation and position on a substrate. The respective directional antennas are configured to transmit a plurality of RF signals and received reflected RF signals. The reflected RF signals are processed by the radar system to determine locations of objects within the field of view of the radar system.

The multiple directional antennas may enable beam steering in all directions to provide more coverage for the radar system. For example, this may allow a scanning range of 360° surrounding the radar system. This 360° scanning range may be beneficial in presence detection and motion detection applications. The incorporation of multiple directional antennas in the radar system may also increase the size of detection regions of the radar system to enable detection of objects, understanding motion of objects, and tracking of target objects in a 360° region surrounding the radar system. For example, a user may be able to control a device that includes the radar system from any location in the 360° region surrounding the radar system.

Various antenna and radar system arrangements may allow a 360° scanning range using multiple sensors. The multiple sensors may also be able to perform beamforming independently. Additionally, multiple sensors may improve spatial resolution of the overall radar system. For example, the multiple sensors may allow the radar system to resolve specific hand gestures or directions of motion.

The multiple stationary directional antennas may provide coverage of a 360° region surrounding the radar system without the use of mechanical constructs to rotate or tilt antenna elements or the radar system. This may reduce complexity, improve noise performance, and simplify calibration of the radar system. The multiple stationary directional antennas may also provide coverage of the 360° region surrounding the radar system without the use of multiple camera arrangements. This may reduce signal processing requirements and lower the cost of the radar system.

Embodiments provided below describe various structures of radar systems and various methods of operating radar systems, in particular, radar systems that have a 360° combined field of view and contain multiple directional antennas. The radar systems may have various advantages over conventional radar systems. The following description describes the embodiments. Several embodiment radar systems with a plurality of directional antennas disposed on a planar surface of a substrate are described using FIGS. 2-6. Two embodiment radar systems attached to a digital media module are described using FIGS. 7 and 8. An embodiment radar system with a plurality of radar subsystems disposed on a planar surface of a substrate is described using FIG. 9. Another embodiment radar system attached to a digital media module is described using FIGS. 10A-10C. Various embodiment radar systems with a plurality of radar subsystems disposed on outer surfaces of a three-dimensional molded substrate are described using FIGS. 11 and 12. An embodiment radar system with a plurality of radar subsystems disposed on outer surfaces of a cuboidal molded substrate is described using FIGS. 13A and 13B. Several embodiments of a radar system with a plurality of planar substrates each including a radar subsystem are described using FIGS. 14-16. An embodiment radar system implemented in the shape of a polygonal prism is described using FIG. 17. An embodiment method of operating a radar subsystem is described using FIG. 18.

Figure 2:
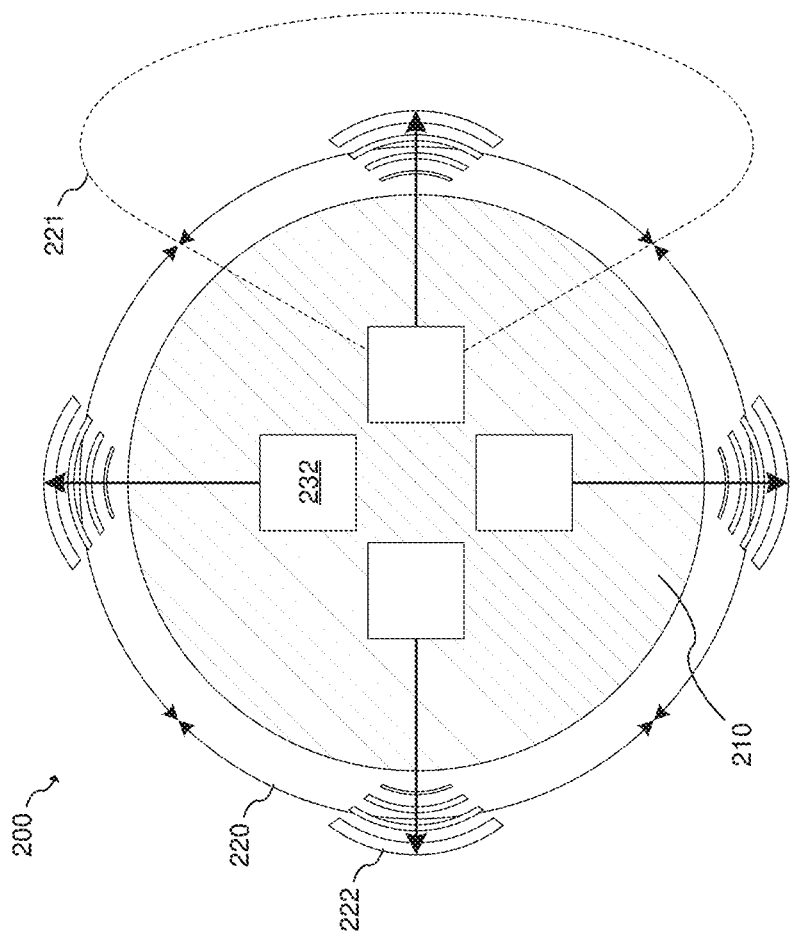
FIG. 2 illustrates an example radar system with a plurality of radar subsystems disposed on a planar surface of a substrate where the radar system has a 360° combined field of view in accordance with an embodiment of the invention.

FIG. 2 illustrates an example radar system with a plurality of radar subsystems disposed on a planar surface of a substrate where the radar system has a 360° combined field of view in accordance with an embodiment of the invention.

Referring to FIG. 2, a radar system 200 includes a plurality of radar subsystems 232 disposed on a planar surface of a substrate 210. The substrate 210 may be any suitable substrate. For example, the substrate 210 may be a printed circuit board, ceramic, or glass substrate. In one embodiment, the substrate 201 is a printed circuit board including a laminate material. In some embodiments, the substrate 210 may include multiple insulting and conducting layers. In various embodiments, the laminate layers include a low-loss high frequency material such as a woven glass reinforced hydrocarbon ceramic and/or polytetrafluoroethylene (PTFE). The substrate 210 may include co-fired ceramic materials such as low temperature co-fired ceramics (LTCCs) or high temperature co-fire ceramics (HTCCs). Alternatively, the substrate 210 may include liquid crystal polymer (LCP) materials. The material of the substrate 210 is not limited to the examples given. Other possible materials may be apparent to those of ordinary skill in the art.

The radar subsystems 232 may be implemented as a plurality of antenna elements formed on the substrate 210 with radio frequency integrated circuit (RFIC) chips coupled to the planar antenna elements. Alternatively, the radar subsystems 232 may each include antenna elements and RF circuitry in a single package that is subsequently attached to the planar surface of the substrate 210.

Each of the radar subsystems 232 is configured to transmit and receive RF signals 222 within a respective field of view 220. The field of view 220 of each radar subsystem 232 is the region within which the radar subsystem 232 can transmit an RF signal and/or detect an RF signal. In some cases a field of view of an antenna, a radar subsystem, or a radar system may be referred to interchangeably as the coverage of the antenna, the radar subsystem, or the radar system. Each individual field of view 220 is less than 360°, and the combined field of view of all radar subsystems 232 in the radar system 220 is equal to 360°. For example, as shown in FIG. 2, each of the four radar subsystems 232 has a field of view 220 equal to about 90° and the combined field of view is 4×90°=360°.

The arrows depicting the RF signals 222 as illustrated in FIG. 2 indicate a direction of the primary lobe 221 of respective RF signals 222 for the plurality of radar subsystems 232. The primary lobe 221, as illustrated, may represent a qualitative signal intensity plot in the plane of the drawing for the respective RF signal 222 where the arrow represents the direction of highest gain. For simplicity, only one primary lobe 221 is shown in FIG. 2. However, each RF signal 222 has as associated primary lobe 221 corresponding to a radar subsystem 232. It should also be noted that in future embodiments, primary lobes of respective RF signals may not be shown, but are assumed to exist for each directional radar subsystem and/or directional antenna.

Additional lobes of varying signal power less than the signal power of the primary lobes may be present in directions other than the directions of the primary lobes. The additional lobes may be referred to as secondary lobes and may be minimized by design. In some cases the directionality of the respective RF signals 222 for the plurality of radar subsystems 232 is large enough that the secondary lobes have little or no impact on the functionality of the radar system 200. The secondary lobes may be ignored when determining the primary direction of transmission/reception for radar subsystems 232 and/or for directional antennas in this and other embodiments.

It should be noted that there are no limitations on overlapping of the fields of view 220. In practice, fields of view 220 of radar subsystems 232 may overlap to some degree. For the purposes of comprehension, the radar system 200 and subsequent radar systems have been illustrated as if the fields of view do not overlap. Such non-overlapping fields of view may be considered effective fields of view and do not necessarily mean that the fields do or do not overlap. In some situations it may be important for the fields of view to be independent of one another while in other situations is may be important for each field of view to overlap with an adjacent field of view.

Overlapping fields of view may also provide redundancy and improve resolution and reliability in certain situations. For example, a radar system may be designed to have four radar subsystems in the configuration illustrated in FIG. 2 with each radar subsystem having a 110° field of view. Consequently, each the fields of view may overlap with adjacent fields of view in 20° regions. A combined field of view of such a radar system may be 4×(110−20)=360°.

Additionally, the respective fields of view 220 of the radar subsystems 232 are not required to be equal. Any number of radar subsystems 232 having any combination of fields of view 220 may be disposed on the substrate 210 to form a combined field of view of 360°. For example, a radar system may have six radar subsystems where four radar subsystems have a 75° field of view and the remaining two radar subsystems have a 30° field of view. A combined field of view for such a radar system may be (4×75°)+(2×50°)=360°. Alternatively, a radar system may have nine radar subsystems each with a 40° field of view. A combined field of view for such an alternative radar system may be 9×40°=360°.

Further, there are no limitations on symmetry for the placement of radar subsystems within the radar system. Radar subsystems with a small field of view may be clustered together on one side of a substrate while radar subsystems with a large field of view may occupy the remaining perimeter of the substrate to provide the 360° combined field of view. Real estate of the substrate or cost considerations may also result in asymmetry of the radar system. Such asymmetries may be accounted for in the signal processing of the radar system.

Figure 3:
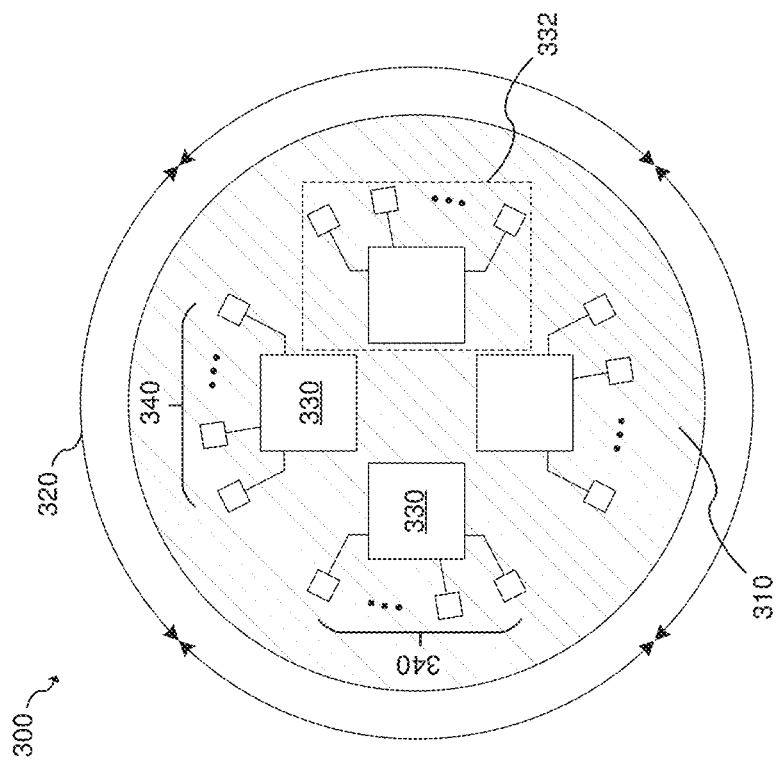
FIG. 3 illustrates an example radar system that has a plurality of directional antennas disposed on a planar surface of a substrate where the radar system has a 360° combined field of view in accordance with an embodiment of the invention.

FIG. 3 illustrates an example radar system that has a plurality of directional antennas disposed on a planar surface of a substrate where the radar system has a 360° combined field of view in accordance with an embodiment of the invention.

Referring to Figure$_3$, a radar system 300 includes a plurality of radar subsystems 332 each including a plurality of directional antennas 340 and a radio frequency integrated circuit (RFIC) chip 330 disposed on a planar surface of a substrate 310. The substrate 310 may be any suitable substrate and may be similar in composition to the substrate 210 of FIG. 2. Additionally, the radar subsystems 332 may be configured in a similar manner as the radar subsystems 232 as described in reference to FIG. 2. Individual fields of view 320 of respective radar subsystems 332 result in a 360° combined field of view for the radar subsystem 300.

In some embodiments, the directional antennas 340 are planar antennas. In one embodiment, each of the directional antennas 340 is a planar Yagi-Uda antenna. In other embodiments, some or all of the plurality of directional antennas 340 is another type of planar antenna such as a slot, ring, spiral and bow-tie configuration, a patch antenna, a tapered slot antenna (TSA), a Vivaldi antenna, a log periodic dipole antenna (LPDA), a quasi-Yagi antenna, a leaky wave antenna (LWA), or the like. In some embodiments, the directional antennas 340 include an electrically conductive material and include copper (Cu) in one embodiment.

In various embodiments, the directional antennas 340 are planar antennas configured to have an end-fire radiation pattern. End-fire radiation patterns may refer to radiation patterns that are in a direction parallel to the plane of the antenna. For example, in FIG. 3, the radar system 300 is shown from a top view perspective. In this case, end-fire radiation patterns refer to radiation patterns within the plane of the drawing, i.e. parallel to the plane of the planar surface of the substrate 340 upon which the directional antennas 340 are disposed.

In alternative embodiments some or all of the directional antennas 340 may be configured to have a broadside radiation pattern. Broadside radiation patterns may refer to radiation patterns that are in a direction perpendicular to the plane of the antenna.

Each of the RFIC chips 330 may include a semiconductor substrate. In one embodiment, the semiconductor substrate includes silicon. For example, the semiconductor substrate may be a silicon on insulator (SOI) such as silicon on silicon dioxide ($SiO_2$) or silicon on sapphire (SOS). In another embodiment, the semiconductor substrate includes silicon germanium (SiGe). In still another embodiment, the semiconductor substrate includes gallium arsenide (GaAs).

Each of the RFIC chips 330 may further include active and passive devices, metal layers, dielectric layers, doped and intrinsic semiconductor regions, and redistribution layers (RDLs) as well as other components known in the art. Additionally, each of the RFIC chips 330 may have a receive interface connected to receiving antennas and/or a transmit interface connected to transmitting antennas. In some configurations, a receive interface and a transmit interface may be combined into a single interface.

Each of the directional antennas 340 may be coupled to one of the RFIC chips 330. A single RFIC chip 330 in combination with one or more directional antennas 340 may constitute a radar subsystem 332. Each of the RFIC chips 330 may include RF circuit elements in an RF front end circuit. In various embodiments, the RFIC chips 330 are disposed on the planar surface of the substrate and are on the same side of the substrate as the directional antennas 340 in one embodiment. Alternatively, some or all of the RFIC chips 330 may be on a different side of the substrate than the plurality of directional antennas 340 or may be on an externally located substrate.

FIG. 4 illustrates an example radar system that has a plurality of radar subsystems each including a plurality of directional antennas disposed on a planar surface of a substrate where the radar system has a 360° combined field of view in accordance with an embodiment of the invention.

Referring to FIG. 4, a radar system 400 includes a plurality of radar subsystems 432 each including a plurality of planar directional antennas 440 and an RFIC chip 430 disposed on a planar surface of a substrate 410. The substrate 410 may be any suitable substrate and may be similar in composition to the substrate 210 of FIG. 2. Additionally, the radar subsystems 432 may be configured in a similar manner as the radar subsystems 232 as described in reference to FIG. 2. Individual fields of view 420 of respective radar subsystems 432 result in a 360° combined field of view for the radar subsystem 400.

In various embodiments, the planar directional antennas 440 are planar Yagi-Uda antennas configured to radiate in an end-fire direction parallel to the plane of the antenna. In one embodiment, each radar subsystem 432 includes four planar directional antennas 440 with two of the planar directional antennas being transmitters (Tx) configured to transmit RF signals and two of the planar directional antennas being receivers (Rx) configured to receive RF signals as illustrated in FIG. 4. This configuration may allow transmission and reception of RF signals within respective fields of view 420 of each radar subsystem 432.

The number of antennas and specific configuration of transmitting and receiving antennas are not limited to this specific arrangement. Any number of planar directional antennas 440 may be included in each radar subsystem 432 and any configuration of transmitters and receivers is possible depending on the specific features of the radar system 400. For example, each radar subsystem 432 may include one transmitter and six receivers. Alternatively, some radar subsystems 432 may include three planar directional antennas 440 while other radar subsystems 432 include six planar directional antennas 440. In other embodiments, some combination of transmitters, receivers, and transceivers may be present in a radar subsystem 432.

Additionally, some or all of the radar subsystems 432 may be formed as single packages containing both an RFIC chip 430 and a plurality of planar directional antennas 440. These self-contained radar subsystems 432 may then be attached to the substrate 410 in a suitable configuration to provide the 360° combined field of view.

FIG. 5 illustrates an example radar system that has a plurality of radar subsystems each including a plurality of directional antennas disposed on a planar surface of a substrate where the radar system has a 360° combined field of view in accordance with an embodiment of the invention.

Referring to FIG. 5, a radar system 500 includes two radar subsystems 532 each including a plurality of planar directional antennas 540 and an RFIC chip 532. The radar system 500 further includes two radar subsystems 536 each including a plurality of directional antennas 540 and an RFIC chip 534. The radar subsystems 532 and 536 are disposed on a planar surface of a substrate 510. The substrate 510 may be any suitable substrate and may be similar in composition to the substrate 210 of FIG. 2. Additionally, the radar subsystems 532 and 536 may be configured in a similar manner as the radar subsystems 232 as described in reference to FIG. 2. Individual fields of view 520 and 524 of respective radar subsystems 532 and 536 result in a 360° combined field of view for the radar system 500.

The radar system 500 is an example of a radar system that has more than one type of radar subsystem. Each radar subsystem 532 has a field of view 520 that is different from the field of view 524 of each radar system 536. The radar subsystems 532 each have six planar directional antennas 540 with two of the six being configured as transmitters (Tx) and four of the six being configured as receivers (Rx). In contrast, the radar subsystems 536 each have two planar directional antennas 540 with one being configured as a transmitter and the other being configured as a receiver.

Figure 6B:
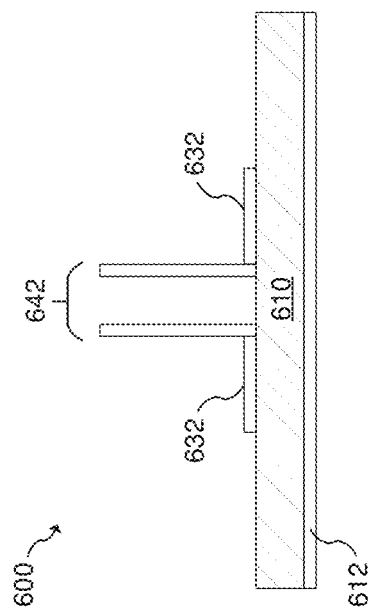
FIGS. 6A and 6B illustrate an example radar system that has a plurality of radar subsystems each including a plurality of directional receiving antennas disposed on a planar surface of a substrate and a plurality of transmitting antennas extending away from the planar surface where the radar system has a 360° combined field of view in accordance with an embodiment of the invention.
Figure 6A:
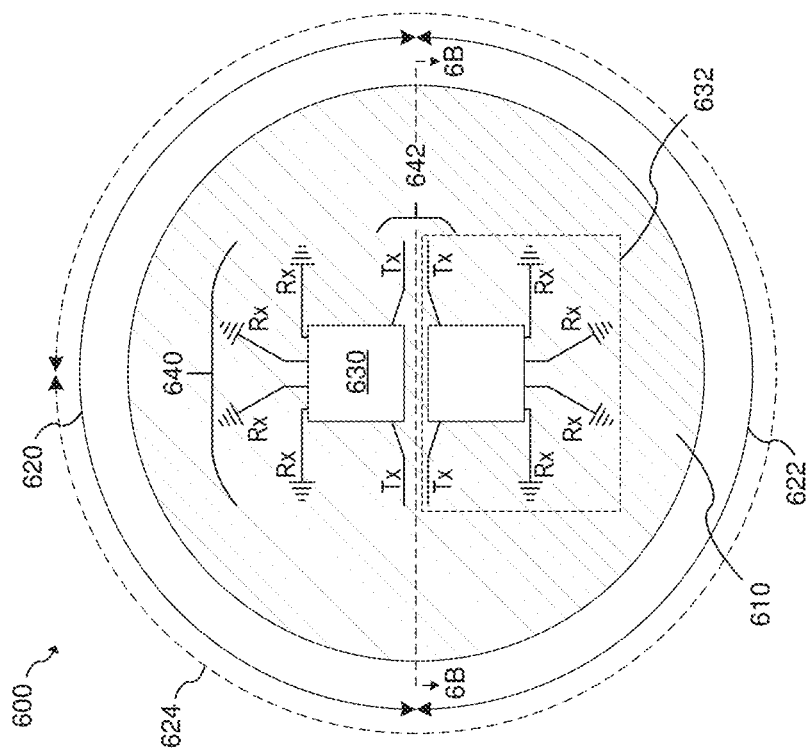

FIGS. 6A and 6B illustrate an example radar system that has a plurality of radar subsystems each including a plurality of directional receiving antennas disposed on a planar surface of a substrate and a plurality of transmitting antennas extending away from the planar surface where the radar system has a 360° combined field of view in accordance with an embodiment of the invention. FIG. 6A illustrates a top view the radar system while FIG. 6B illustrates a side view of the radar system.

Referring to FIGS. 6A and 6B, a radar system 600 includes a plurality of radar subsystems 632 each including a plurality of receivers 640, a plurality of transmitters 642, and an RFIC chip 630 disposed on a planar surface of a substrate 610. The substrate 610 may be any suitable substrate and may be similar in composition to the substrate 210 of FIG. 2. Additionally, the radar subsystems 632 may be configured in a similar manner as the radar subsystems 232 as described in reference to FIG. 2. Individual receiving fields of view 620 and the transmitting field of view 624 of radar subsystems 632 result in a 360° combined field of view for the radar subsystem 600.

The radar system 600 further includes a ground plane 612 disposed on the side of the substrate 610 opposite the radar subsystems 632. In various embodiments, the ground plane 612 includes a conductive material and includes copper (Cu) in one embodiment. In this way, the ground plane 612 may serve to reduce or eliminate the propagation of RF signals from one side of the ground plane 612 to the other. It should be noted that any of the embodiment radar systems described herein may be implemented with one or more ground planes.

The receivers 640 are planar directional antennas in some embodiments. In one embodiment, the receivers 640 are planar Yagi-Uda antennas. RF signals received by the receivers 640 may be stronger in some directions than other directions. The directions from which RF signals detected at the receivers 640 are strong result in the receiving fields of view 620. Each individual receiver 640 may have a receiving field of view that contributes to the receiving field of view 620 of each radar subsystem 632. The total combined receiving field of view is 360°.

In various embodiments, the transmitters 642 are omnidirectional antennas. In one embodiment, the transmitters 642 extend in a direction perpendicular to the plane of the receivers 640. In one embodiment, the transmitters 642 are monopole antennas. Other types of nonplanar antennas may be used as transmitters 642 in other embodiments. The transmitters 642 may all have a transmitting field of view 624 that extends the entire 360° around the radar system 600 as shown in FIG. 6A.

The embodiments described herein are by no means an exhaustive list of possible configurations of radar subsystems and/or antenna elements in a radar system that has a 360° combined field of view. Many additional arrangements of radar subsystems and/or antenna elements disposed on a planar surface of a substrate that result in a 360° combined field of view will be apparent to those of ordinary skill in the art.

Figure 7A:
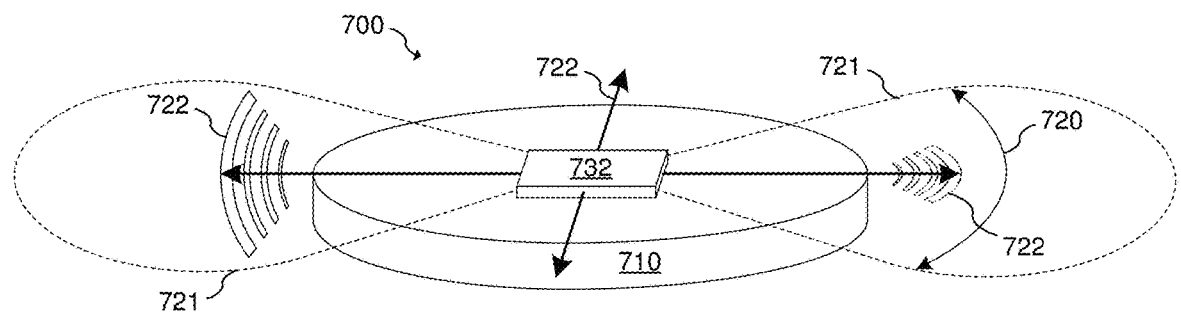
FIGS. 7A-7C illustrate an example radar system including a radar module disposed on a planar surface of a substrate, a conductive plate, and a digital media module, where the radar system has a 360° combined field of view in accordance with an embodiment of the invention.
Figure 7B:
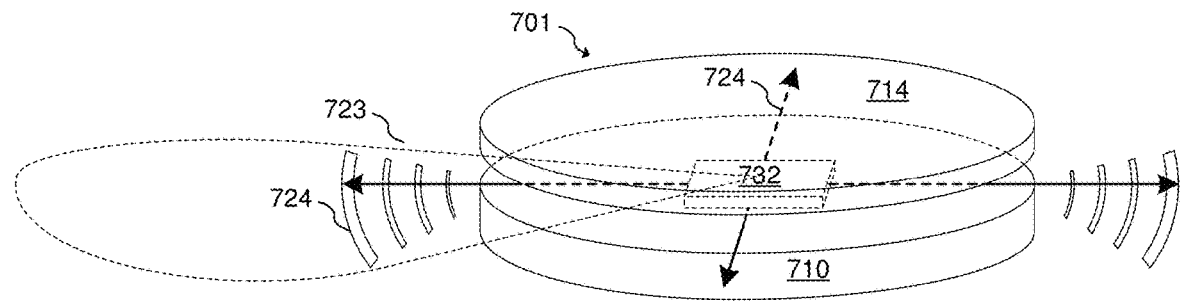
Figure 7C:
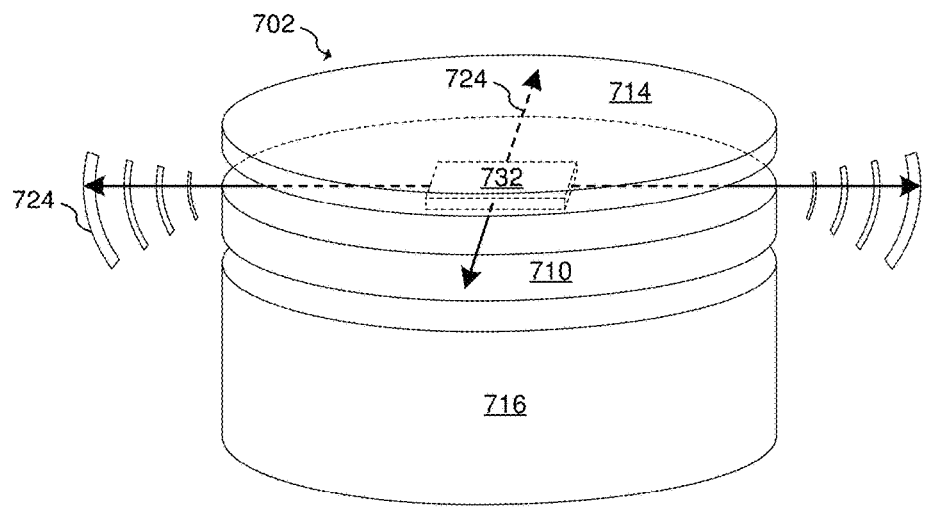

FIGS. 7A-7C illustrate an example radar system including a radar module disposed on a planar surface of a substrate, a conductive plate, and a digital media module, where the radar system has a 360° combined field of view in accordance with an embodiment of the invention. FIG. 7A illustrates the substrate, FIG. 7B illustrates the substrate and the conductive plate, and FIG. 7C illustrates the substrate, conductive plate, and the digital media module.

Referring to FIG. 7A, a radar system 700 includes a radar module 732 disposed on a planar surface of a substrate 710. The substrate 710 may be any suitable substrate and may be similar in composition to the substrate 210 of FIG. 2. The radar module 732 may include a plurality of radar subsystems each including a plurality of directional antennas and an RFIC chip as previously described in reference to FIGS. 2-6, for example. In various embodiments, the radar module 732 is configured to transmit and receive a plurality of directional RF signals 722 corresponding to a plurality of individual fields of view 720 that result in a 360° combined field of view in the plane of the planar surface of the substrate 710.

For example, in one embodiment, the radar module 732 may include four radar subsystems each including an RFIC chip, two planar directional antennas configured as receivers, and two planar directional antennas configured as transmitters as illustrated in FIG. 4. In other embodiments, the radar module 732 may be implemented using any suitable combination directional antenna elements and RFIC chips arranged as radar subsystems.

As shown in FIG. 7A, the RF signals 722 each include a component parallel to the planar surface of the substrate 710 as well as a component perpendicular to the planar surface. In some cases, these components may be approximately equal to each other. Alternatively, either the parallel component or the perpendicular component may be larger.

As with previous embodiments, each of the RF signals 722 has a corresponding primary lobe 721. The primary lobes 721 are shown as qualitative examples of the directionality for respective RF signals 722 and are as previously described. In FIG. 7A, a representative primary lobe 721 is shown for directions parallel and perpendicular to the planar surface of the substrate 710.

Referring now to FIG. 7B, a radar system 701 includes a conductive plate 714 disposed at a fixed distance above the radar module 732 and the substrate 710. The conductive plate 714 includes conductive material in some embodiments, and includes aluminum (Al) in one embodiment. The shape of the conductive plate 714 may be influenced by the desired effect of the conductive plate 714 on the radar system 701. In one embodiment, the conductive plate 714 is substantially planar, but may be any conceivable shape.

The conductive plate 714 may be configured to decrease the perpendicular components of the RF signals 724 above the substrate 710 while increasing the parallel components. For example, as shown in FIGS. 7A and 7B, the RF signals 724 are stronger than the RF signals 722 in directions parallel to the planar surface of the substrate 710 while the perpendicular components of the RF signals 724 above the substrate 710 are reduced by the conductive plate 714 compared to the RF signals 722. Additionally, the primary lobe 732 is illustrated to show the difference in the directionality of RF signals 722 as influenced by the conductive plate 714. The conductive plate 714 may be configured to affect some directions of propagation of the RF signals 724 more than others depending on the specific functionality of the radar system 701. Additionally, the conductive plate 714 may server as a heatsink for the radar system by conducting heat away from the substrate 710.

An additional conductive plate may optionally be included below substrate 710 to further modify the directionality of the RF signals 724 in some embodiments. In some embodiments, a ground plane may optionally be included below the substrate 710 for similar reasons.

Referring to FIG. 7C, a radar system 702 includes a conductive plate 714 disposed above the radar module 732 and the substrate 710 with a digital media module 716 attached below the substrate 710. The digital media module 716 is operationally coupled to the radar module 732 when the substrate 710 is mounted above the digital media module 716. In one embodiment, the digital media module 716 includes connectors that interface with the substrate 710 and/or the radar module 732 to facilitate coupling.

The digital media module 716 may be an audio system, for example. Alternatively, the digital media module 716 may be any other electronic device that receives user input as signals from the radar module 732. For example, the digital media module 716 may be a personal assistant system, infotainment system, internet of things system, smart home system, set top box, game console system, and the like.

A user may control the digital media module 716 by performing movements or gestures in the region of the 360° combined field of view of the radar system 702. In some cases, the digital media module 716 may be configured to maintain an awakened state (e.g. a full power, fully functional state) while the presence of a user is detected by the radar module 732 and enter a sleep state (e.g. a low power, reduced functionality state) when no user is detected.

Figure 8A:
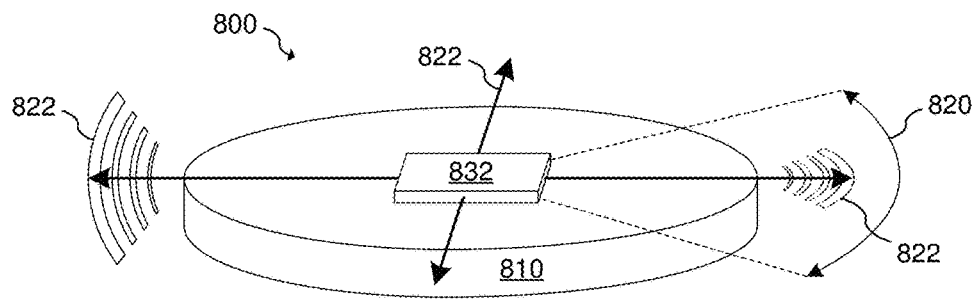
FIGS. 8A-8C illustrate an example radar system including a radar module disposed on a planar surface of a substrate, a conductive plate, and a digital media module, where the radar system has a 360° combined field of view in accordance with an embodiment of the invention.
Figure 8B:
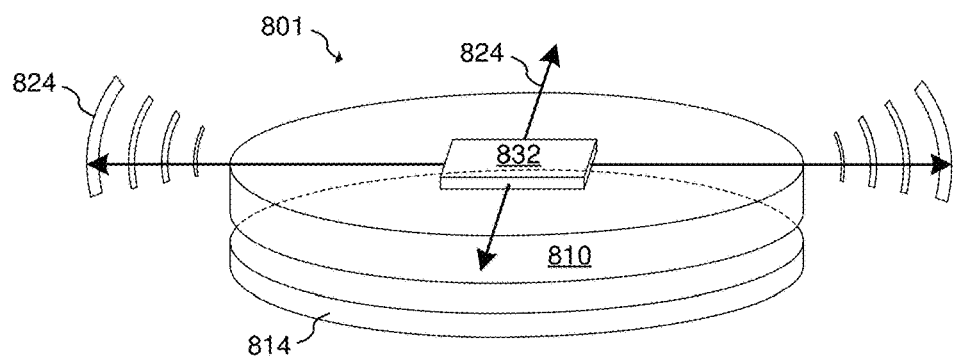
Figure 8C:
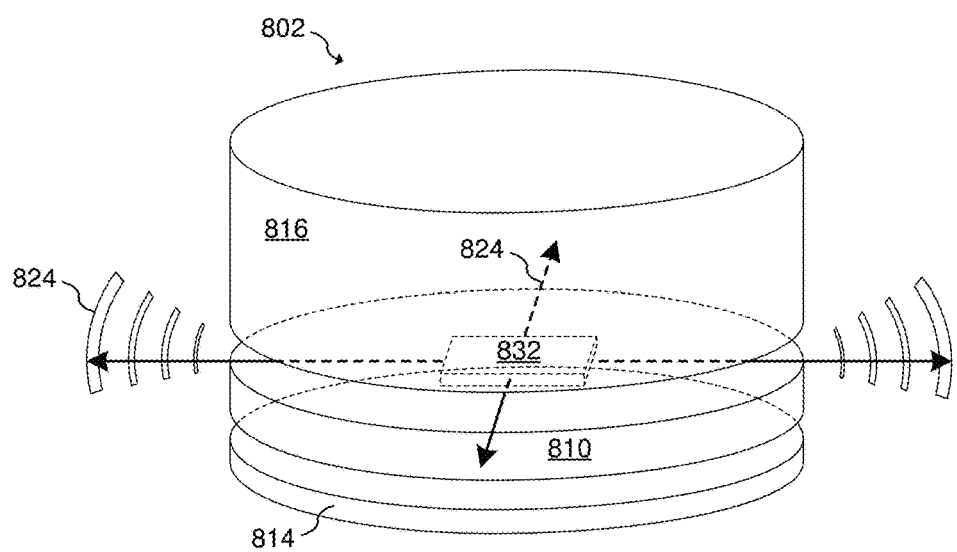

FIGS. 8A-8C illustrate an example radar system including a radar module disposed on a planar surface of a substrate, a conductive plate, and a digital media module, where the radar system has a 360° combined field of view in accordance with an embodiment of the invention. FIG. 8A illustrates the substrate, FIG. 8B illustrates the substrate and the conductive plate, and FIG. 8C illustrates the substrate, conductive plate, and the digital media module.

Referring to FIG. 8A, a radar system 800 includes a radar module 832 disposed on a planar surface of a substrate 810. The substrate 810 may be any suitable substrate and may be similar in composition to the substrate 210 of FIG. 2. The radar module 832 may be configured in a similar manner as the radar module 732 previously described in reference to FIGS. 7A-7C. The radar module 832 is configured to transmit and receive RF signals 822 corresponding to individual fields of view 820 such that the radar system 800 has a 360° combined field of view in the plane of the planar surface of the substrate 810.

Referring now to FIG. 8B, the radar system 801 includes a conductive plate 814 disposed below the substrate 810. The conductive plate 814 may be similar to the conductive plate 714 as described previously. In various embodiments, the conductive plate 814 is configured to reduce components of RF signals 824 perpendicular to the planar surface that are below the substrate 810 while increasing components of the RF signals 824 that are parallel to the planar surface. A qualitative comparison of RF signals 824 and RF signals 822 is illustrated in FIGS. 8A and 8B.

Referring to FIG. 8C, the radar system 802 includes a digital media module 816 attached above the radar module 832, the substrate 810, and the conductive plate 814. The digital media module 816 may be similar to the digital media module 716 previously described in reference to FIGS. 7A-7C. The radar module 832 is operationally coupled to the digital media module 816 when the substrate 810 is mounted below the digital media module 816. In one embodiment, the digital media module 816 includes connectors that interface with the substrate 810 and/or the radar module 832 to facilitate coupling.

Figure 9:
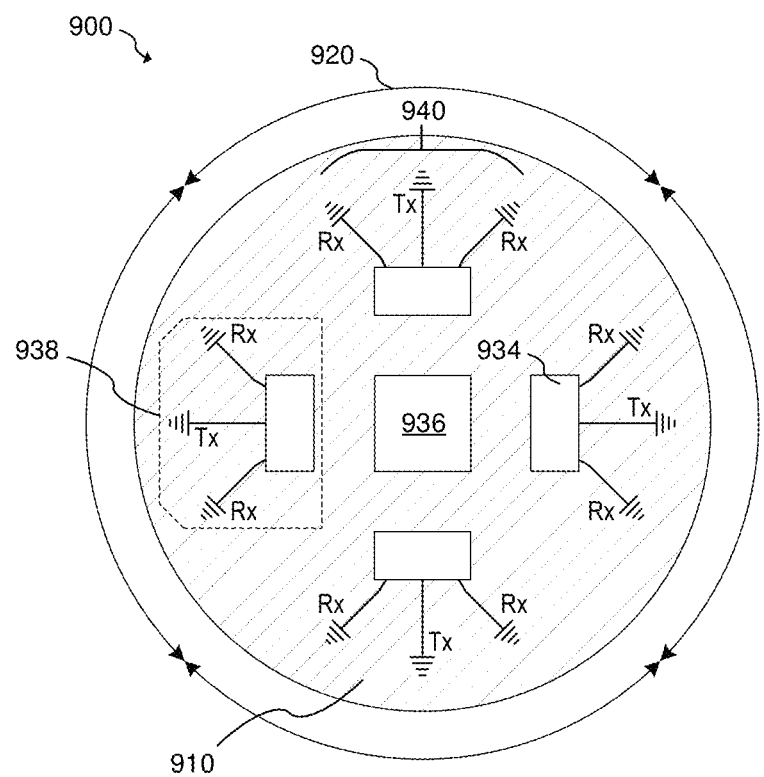
FIG. 9 illustrates an example radar system that has a plurality of radar subsystems disposed on a planar surface of a substrate, where the radar system has a 360° combined field of view and is configured to detect objects located directly above the planar surface in accordance with an embodiment of the invention.

FIG. 9 illustrates an example radar system that has a plurality of radar subsystems disposed on a planar surface of a substrate, where the radar system has a 360° combined field of view and is configured to detect objects located directly above the planar surface in accordance with an embodiment of the invention.

Referring to FIG. 9, a radar system 900 includes a plurality of radar subsystems 938 each including a plurality of planar directional antennas 940 and an RFIC chip 934. The radar system 900 further includes a radar subsystem 936. The radar subsystems 938 and 936 are disposed on a planar surface of a substrate 910. The substrate 910 may be any suitable substrate and may be similar in composition to the substrate 210 of FIG. 2. The radar subsystems 938 have individual fields of view 920 which result in a 360° combined field of view for the radar system 900.

The radar system 900 may include at least two types of radar subsystem, illustrated in FIG. 9 as radar subsystem 938 and radar subsystem 936. In various embodiments, the radar subsystems 938 are configured to have an end-fire radiation pattern so as to transmit and receive RF signals in directions parallel to the planar surface of the substrate 910. In one embodiment, the radar system 900 includes four radar subsystems 938 each including two receivers (Rx), a transmitter (Tx), and an RFIC chip 934. The four radar subsystems 938 may have individual fields of view of about 90°, but other quantities of radar subsystems and differing fields of view are possible as previously described. The radar subsystem 936 may be configured to have a broadside radiation pattern so as to transmit and receive RF signals in directions perpendicular to the planar surface of the substrate 910. For example, the radar subsystem 936 may include a plurality of patch antennas disposed on the substrate 910 or integrated within the radar subsystem 936. In one embodiment, the radar subsystem 936 may be configured to have a field of view that includes the region directly above the substrate 910.

In some applications, the radar system 900 may be configured to detect the presence and movement of objects in the region of the 360° combined field of view and also directly above the substrate. The radar subsystems 938 may provide sensing capabilities for the 360° combined field of view surrounding the radar system 900 while the radar subsystem 936 may provide sensing capabilities for the region directly above the radar system 900. In some cases, the functionality of the radar subsystems 938 may be different from the functionality of the radar subsystem 936. For example, the radar subsystems 938 may be configured only to detect the presence of a user in the region around the radar system 900 while the radar subsystem 936 may be configured to sense fine movement of objects above the radar system 900. Such fine movement detection may be important for accurate interpretation of gestures for user input. Alternatively, all radar subsystems 936 and 938 may be configured with similar functionality to provide the same level of radar detection on the region surrounding the radar system 900 as well as the region directly above the radar system 900.

In some embodiments, the radar subsystems 938 may be configured to operate at a different RF frequency than the radar subsystem 936. In one embodiment, the radar subsystems 938 are configured to operate at 24 GHz while the radar subsystem 936 is configured to operate at 60 GHz. In another embodiment, the radar subsystems 938 and 936 are configured to operate at 60 GHz. In still another embodiment, the radar subsystems 938 and 936 are configured to operate at 24 GHz.

Specific operational frequencies for each radar subsystem may depend on a variety of design considerations including range, functionality, size, cost, and the like. The radar subsystems and radar modules described herein are not intended to be limited to the explicitly referenced frequencies as other possible operational frequencies will be readily apparent to those of ordinary skill in the art.

Figure 10A:
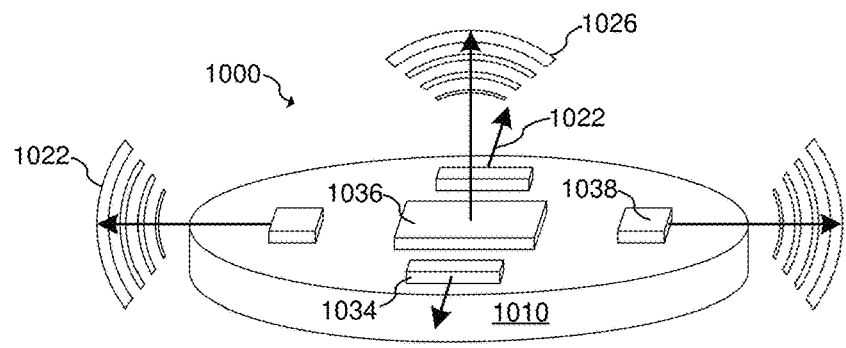
FIGS. 10A-10C illustrate an example radar system including a plurality of radar subsystems disposed on a planar surface of a substrate, a conductive plate, and a digital media module, where the radar system has a 360° combined field of view and is configured to detect objects located directly above the planar surface in accordance with an embodiment of the invention.
Figure 10B:
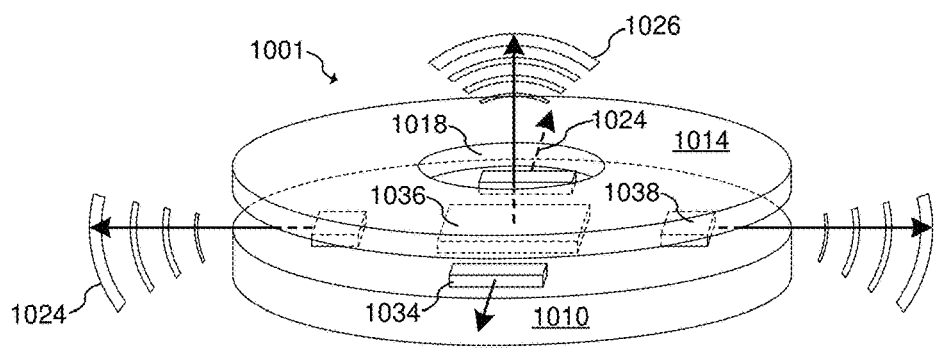
Figure 10C:
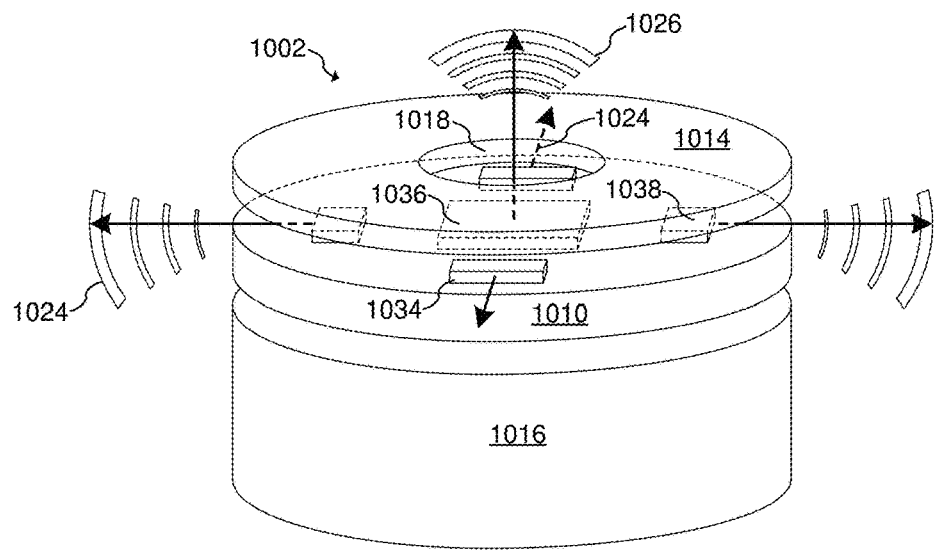

FIGS. 10A-10C illustrate an example radar system including a plurality of radar subsystems disposed on a planar surface of a substrate, a conductive plate, and a digital media module, where the radar system has a 360° combined field of view and is configured to detect objects located directly above the planar surface in accordance with an embodiment of the invention. FIG. 10A illustrates the substrate, FIG. 10B illustrates the substrate and the conductive plate that has an opening, and FIG. 10C illustrates the substrate, conductive plate, and the digital media module.

Referring to FIG. 10A, a radar system 1000 includes a plurality of radar subsystems 1038 and a radar subsystem 1036 disposed on a planar surface of a substrate 1010. The radar system 1000 may be a specific implementation of the radar system 900 as previously described in reference to FIG. 9. For example, the radar system 1000 may be a three-dimensional view of the radar system 900. The radar subsystems 1038 each are configured to transmit and receive RF signals 1022 such that the radar system 1000 has a 360° combined field of view in the plane of the planar surface 1010. The radar subsystem 1036 is configured to transmit and receive RF signals 1026 such that the radar system 1000 can detect objects in the region directly above the substrate 1010.

Referring now to FIG. 10B, the radar system 1001 includes a conductive plate 1014 disposed above the substrate 1010. In various embodiments, the conductive plate 1014 includes a conductive material, and includes aluminum (Al) in one embodiment. The conductive plate 1014 may influence the directionality of the RF signals 1024 transmitted and received by the radar subsystems 1038. For example, the conductive plate 1014 may reduce components of the RF signals 1024 that are perpendicular to the planar surface while increasing components of the RF signals 1024 that are parallel to the planar surface. Such effects may be similar to those previously described in reference to the conductive plate 714 of FIGS. 7A-7C.

The conductive plate 1014 includes an opening 1018 in a central region of the conductive plate 1014. The opening 1018 may be vertically aligned with the radar subsystem 1036 so as to allow the RF signals 1026 to pass through the opening. In one embodiment, the opening 1018 is configured to allow the passage of RF signals 1026 through the opening 1018 with little or no modification. Alternatively, the opening 1018 may be configured to modify the directionality of the RF signals 1026.

In some applications, the conductive plate 1014 may act as a heatsink for the radar subsystems 1038 and 1036. The conductive plate 1014 may advantageously increase the directionality of the RF signals 1024 of radar subsystems 1038 while allowing the radar subsystem 1036 to transmit and receive RF signals 1026 in the region directly above the radar system 1001.

Referring to FIG. 10C, the radar system 1002 includes a digital media module 1016 attached below the radar subsystems 1038 and 1036, the substrate 1010, and the conductive plate 1014. The digital media module may be similar to the digital media module 716 previously described in reference to FIGS. 7A-7C. The digital media module 1016 is operationally coupled to the radar module 1032 when the substrate 1010 is mounted above the digital media module 1016. In one embodiment, the digital media module 1016 includes connectors that interface with the substrate 1010 and/or the radar module 1032 to facilitate coupling.

For the purposes of clarity, the radar systems described in reference to FIGS. 7, 8, and 10 are shown with space between conductive plates, substrates, and digital media modules. Such space may or may not be necessary depending on specific embodiments. For example, conductive plates included above and below a substrate containing a radar module may be at a specific height above the substrate in order to attain desired directionality of RF signals transmitted and received at the radar module. In cases where a conductive plate is used as a heatsink, thermal contact may be important between the conductive plate and the radar module or substrate. In such cases direct contact may be made, or thermally conductive materials may be interposed between the conductive plate and the radar module and substrate. Similarly, various design considerations may result in having space or not having space between a substrate containing a radar module and a digital media module.

It should be noted that although the radar systems described in reference to FIGS. 7, 8, and 10 are shown to be cylindrical in shape, any conceivable shape is possible. Additionally, the radar systems are not limited to being at the top or bottom of an electronic device. Radar systems may conceivably be centrally located within an electronic device. In some cases the radar systems may be integrated in the interior of an electronic device and may not be adjacent to any outer surface of the electronic device. Various components that are transparent to RF signals may surround the radar system within the electronic device.

Figure 11A:
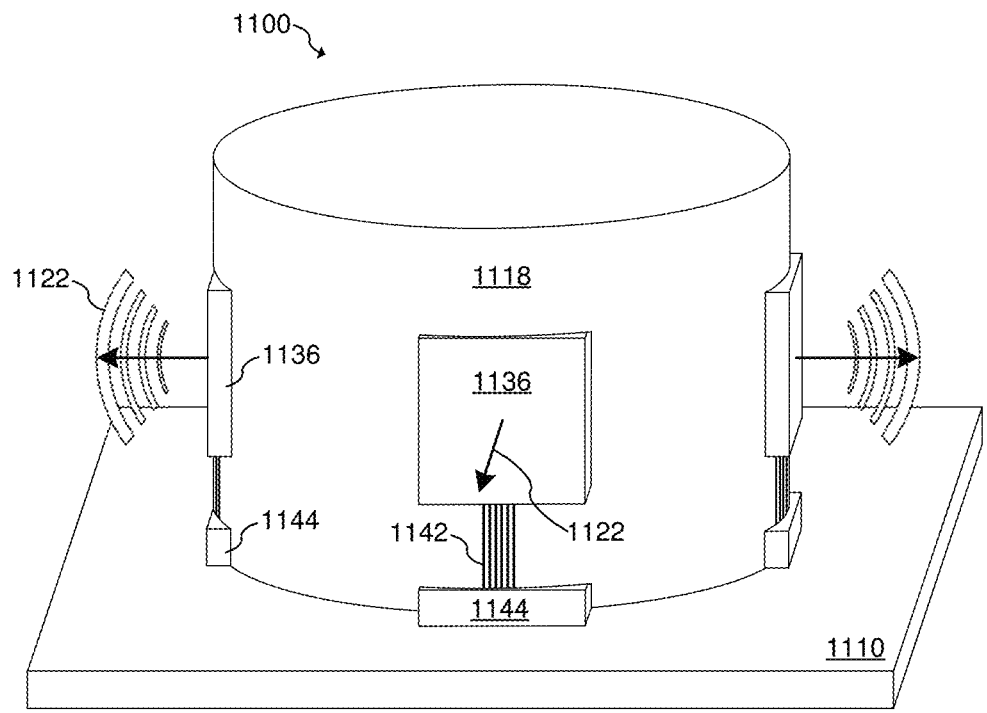
FIGS. 11A and 11B illustrate an example radar system that has a plurality of radar subsystems disposed on outer surfaces of a three-dimensional molded first substrate that is disposed on a planar surface of a second substrate where the radar system has a 360° combined field of view in accordance with an embodiment of the invention.
Figure 11B:
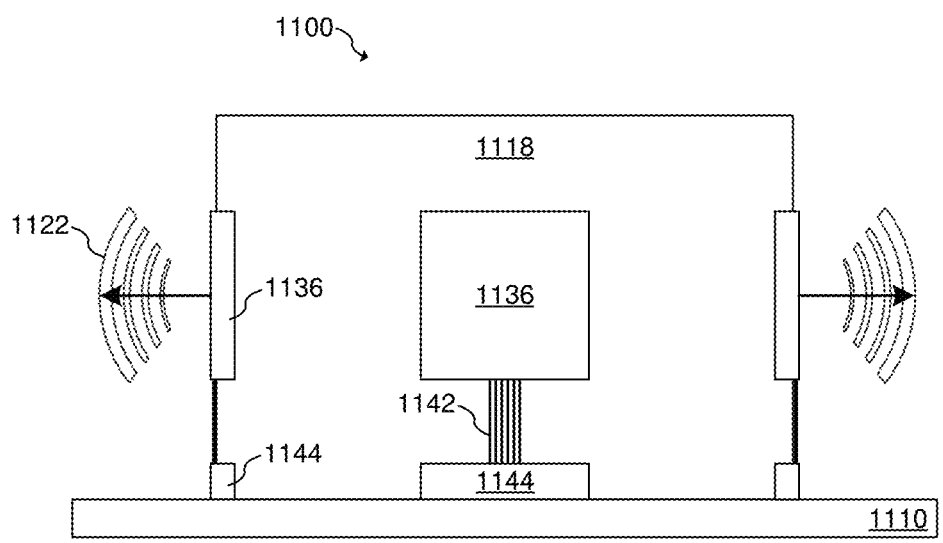

FIGS. 11A and 11B illustrate an example radar system that has a plurality of radar subsystems disposed on outer surfaces of a three-dimensional molded substrate that is disposed on a planar surface of a second substrate, where the radar system has a 360° combined field of view in accordance with an embodiment of the invention.

Referring to FIGS. 11A and 11B, a radar system 1100 includes a plurality of radar subsystems 1136 disposed on an outer surface of a three-dimensional molded substrate 1118. The three-dimensional molded substrate 1118 is disposed on a planar surface of a second substrate 1110 such that the radar subsystems 1136 are coupled to circuitry on the second substrate 1110 using conductive traces 1142 and connectors 1144. Each of the radar subsystems 1136 may be configured to have a broadside radiation pattern in order to transmit and receive RF signals 1122 in a direction perpendicular to the outer surface of the three-dimensional molded substrate 1118.

In various embodiments, the three dimensional molded substrate 1118 may be formed using a molding technology such as molded interconnect device (MID) technology and may include a plastic material. In one embodiment, the three-dimensional molded substrate 1118 includes a thermoplastic material. In one embodiment, the three-dimensional molded substrate 1118 is a solid piece formed using injection molding techniques. Advantageously, mounting surfaces for the radar subsystems 1136 and the connectors 1144 may be formed as part of the mold and may not require additional etching or grinding techniques.

Such techniques may advantageously facilitate the formation of virtually any desirable three-dimensional shape. For example, the three-dimensional molded substrate 1118 of FIGS. 11A and 11B is shown to have a cylindrical shape. However, in alternative embodiments, the three-dimensional molded substrate 1118 may be any conceivable three-dimensional shape such as an elliptical cylinder, pyramid, regular prism, cuboid, sphere, and the like. A further benefit of using injection molding techniques to form the three-dimensional molded substrate 1118 may be the formation of irregular three-dimensional shapes to fit specific packaging requirements in a device.

Structuring of the outer surface of the three-dimensional molded substrate 1118 to create conductive traces 1142 may be formed using a technology such as laser direct structuring (LDS). Specifically, the outer surface of the three-dimensional molded substrate 1118 may be doped or polished with a conductive material. A laser may then be used to trace pathways for the conductive traces 1142 which activates the conductive material at the outer surface and creates a rough surface with exposed conductive material. The exposed conductive material may then act as nucleation sites during subsequent metallization. Following the formation of conductive traces 1142, the radar subsystems 1136 may be soldered or otherwise coupled to the conductive traces 1142.

In some embodiments, the connectors 1144 may be replaced with other means of coupling the conductive traces 1142 to the second substrate 1110. For example, a ball grid array (BGA) and solder reflow process may be used to provide electrical and physical connections between the three-dimensional molded substrate 1118 and the second substrate 1110. The three-dimensional molded substrate 1118 may also be attached to the second substrate 1110 using an adhesive such as epoxy or screwed into place. The conductive traces 1142 may then be wire bonded or directly soldered to contact pads on the second substrate 1110.

Figure 12A:
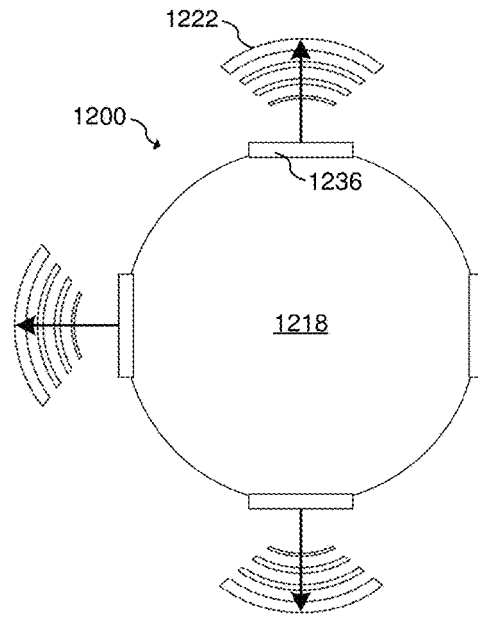
FIGS. 12A-12D illustrate several example radar systems that have a 360° combined field of view in accordance with embodiments of the invention.
Figure 12B:
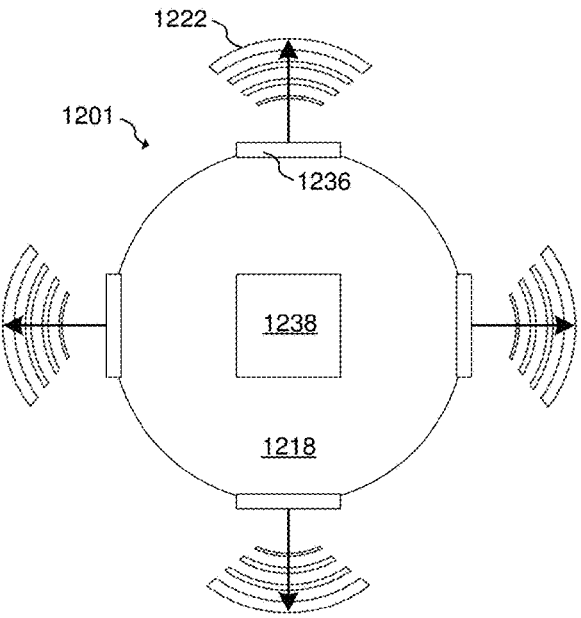
Figure 12C:
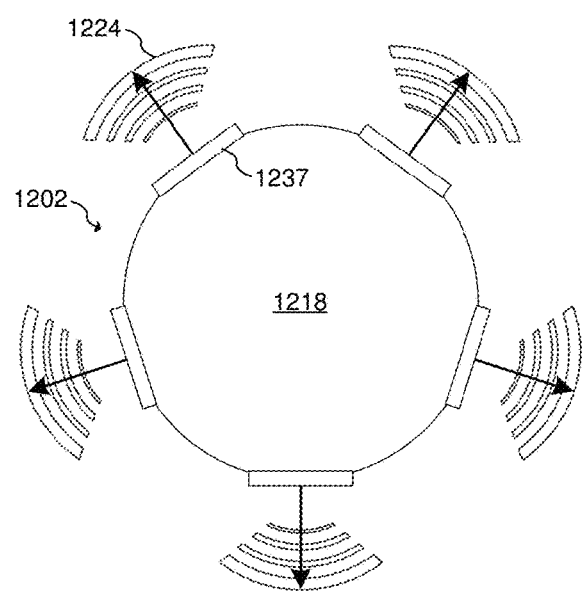
Figure 12D:
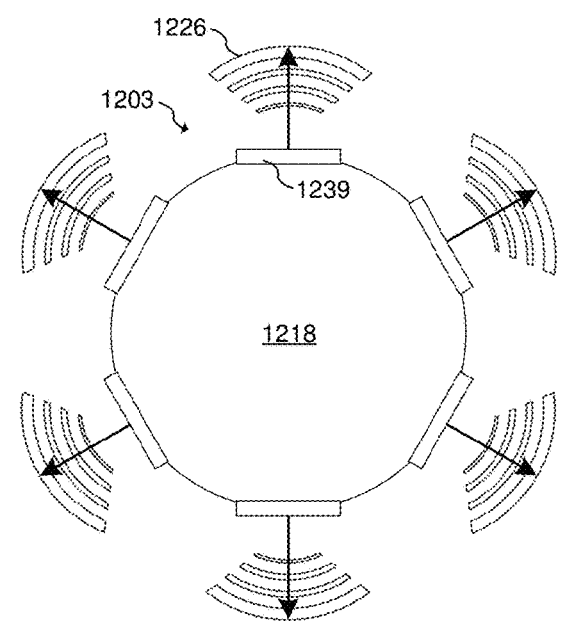

FIGS. 12A-12D illustrate several example radar systems that have a 360° combined field of view in accordance with embodiments of the invention. FIGS. 12A, 12B, 12C, and 12D illustrate various configurations of multiple radar subsystems disposed on a cylindrical molded substrate. FIG. 12A illustrates a top view of an example radar system that has four radar subsystems disposed on a curved surface of a cylindrical molded substrate. FIG. 12B illustrates a top view of another example radar system that has four radar subsystems disposed on a curved surface of a cylindrical molded substrate and an additional radar subsystem disposed on a planar surface of the cylindrical molded substrate, FIG. 12C illustrates still another example radar subsystem that has five radar subsystems disposed on a curved surface of a cylindrical molded substrate, and FIG. 12D illustrates yet another example radar system that has six radar subsystems disposed on a curved surface of a cylindrical molded substrate.

Referring to FIG. 12A, a radar system 1200 includes four radar subsystems 1236 disposed on an outer curved surface of a cylindrical molded substrate 1218. Each of the radar subsystems 1236 are configured to have broadside radiation patterns so that RF signals 1222 may be transmitted and received in directions perpendicular to the cylindrical molded substrate 1218. The radar system 1200 is configured to have a 360° combined field of view.

Referring to FIG. 12B, a radar system 1201 includes a radar subsystem 1238 disposed on a planar surface of a cylindrical molded substrate 1218 in addition to four radar subsystems 1236 disposed on the outer curved surface of a cylindrical molded substrate 1218. The radar system 1201 is configured to detect objects in a region directly above the cylindrical molded substrate 1218 in addition to having a 360° combined field of view in a region surrounding the cylindrical molded substrate 1218.

Referring to FIG. 12C, a radar system 1202 includes five radar systems 1237 disposed on an outer curved surface of a cylindrical molded substrate 1218. Each of the radar subsystems 1237 are configured to have broadside radiation patterns so that RF signals 1224 may be transmitted and received in directions perpendicular to the cylindrical molded substrate 1218. The radar system 1202 is configured to have a 360° combined field of view.

Referring to FIG. 12D, a radar system 1203 includes six radar systems 1239 disposed on an outer curved surface of a cylindrical molded substrate 1218. Each of the radar subsystems 1239 are configured to have broadside radiation patterns so that RF signals 1226 may be transmitted and received in directions perpendicular to the cylindrical molded substrate 1218. The radar system 1203 is configured to have a 360° combined field of view.

The radar subsystems 1237 and 1239 may have narrower individual fields of view when compared to the individual fields of view of radar subsystems 1236 because of the additional number of radar subsystems surrounding the cylindrical molded substrate 1218. For example, a minimum field of view for a radar subsystem 1236 in radar systems 1200 and 1201 may be 90° since there are four radar subsystems 1236 surrounding the cylindrical molded substrate 1218. In contrast, the minimum fields of view for radar subsystems 1237 and 1239 in radar systems 1202 and 1203 may be 72° and 60° respectively. However, as previously mentioned, there is no requirement that each radar subsystem has exactly a minimum field of view. The individual fields of view of radar subsystems in any embodiment described herein may overlap with the individual fields of view of adjacent radar subsystems.

The radar subsystem 1238 of radar system 1201 is illustrated as being added to radar system 1200 to add sensing capabilities in the region above the cylindrical molded substrate. However, the radar subsystem 1238 is not limited to be incorporated into radar system 1200. The radar subsystem 1238 may be implemented on a planar surface of radar systems 1202 or 1203 as well as many other embodiments described herein as will be apparent to one of ordinary skill in the art.

Figure 13A:
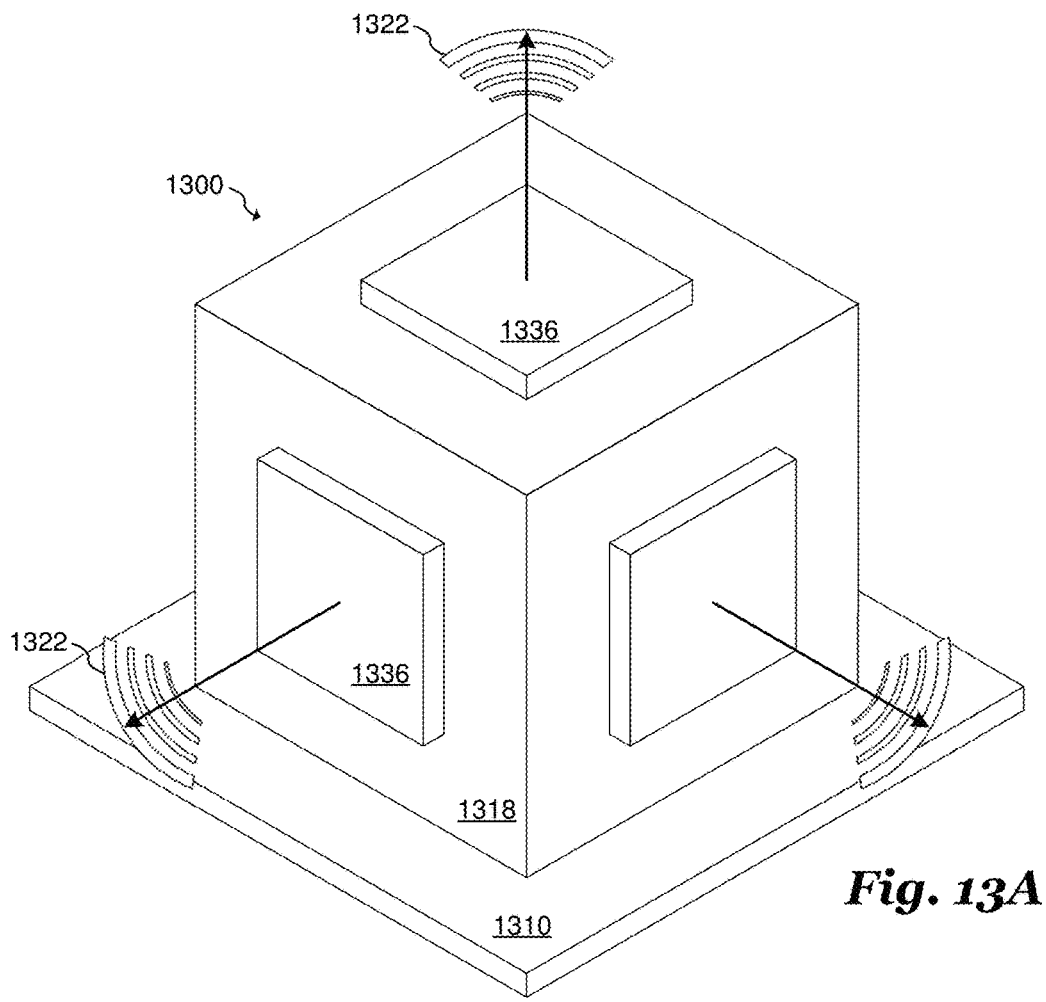
FIGS. 13A and 13B illustrate an example radar system that has a plurality of radar subsystems disposed on outer surfaces of a cuboidal molded first substrate that is disposed on a planar surface of a second substrate, where the radar system has a 360° combined field of view in a plane parallel to the planar surface and is configured to detect objects located directly above the planar surface in accordance with an embodiment of the invention.
Figure 13B:
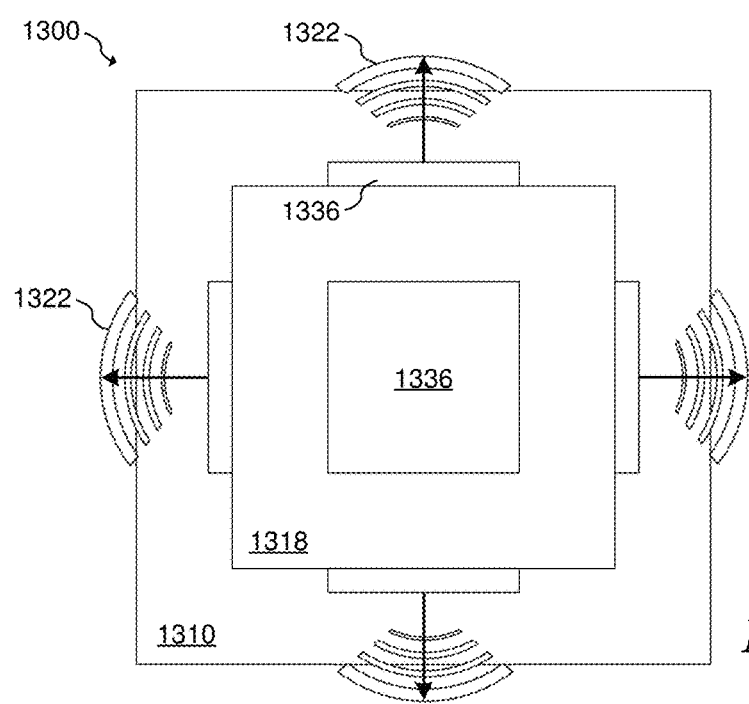

FIGS. 13A and 13B illustrate an example radar system that has a plurality of radar subsystems disposed on outer surfaces of a cuboidal molded first substrate that is disposed on a planar surface of a second substrate, where the radar system has a 360° combined field of view in a plane parallel to the planar surface and is configured to detect objects located directly above the planar surface in accordance with an embodiment of the invention. FIG. 13A illustrates an isometric view of the radar system while FIG. 13B illustrates a top view of the radar system.

Referring to FIGS. 13A and 13B, a radar system 1300 includes a plurality of radar subsystems 1336 disposed on planar surfaces of a cuboidal molded substrate 1318. The cuboidal molded substrate is disposed on a planar surface of a second substrate 1310 so that circuitry on the second substrate 1310 is coupled to radar subsystems 1336. The cuboidal molded substrate 1318 may be a three-dimensional molded substrate as previously described in reference to FIGS. 11A and 11B. The second substrate 1310 may be any suitable substrate and may be similar in composition to the substrate 210 of FIG. 2.

Each of the radar subsystems 1336 is configured to transmit and receive RF signals 1322 in directions perpendicular to the planar surfaces of the cuboidal molded substrate 1318. The radar system 1300 is configured to have a 360° combined field of view in a plane parallel to the plane of the second substrate 1310 as well as being configured to detect objects in the region directly above the cuboidal molded substrate 1318.

In one embodiment, the cuboidal molded substrate 1318 is a cube. Alternatively, the cuboidal molded substrate 1318 may be any three-dimensional shape. As previously mentioned, the surfaces of the cuboidal molded substrate 1318 are not limited to being planar. Any combination of curved and planar surfaces may be incorporated per specific design considerations. The radar subsystems 1336 are shown to be the same in FIGS. 13A and 13B. However, there is no requirement that any specific radar subsystems be the same as any other radar subsystems as has been previously discussed. In some embodiments, one or more of the radar subsystems 1336 may be omitted depending on specific design considerations.

Figure 14:
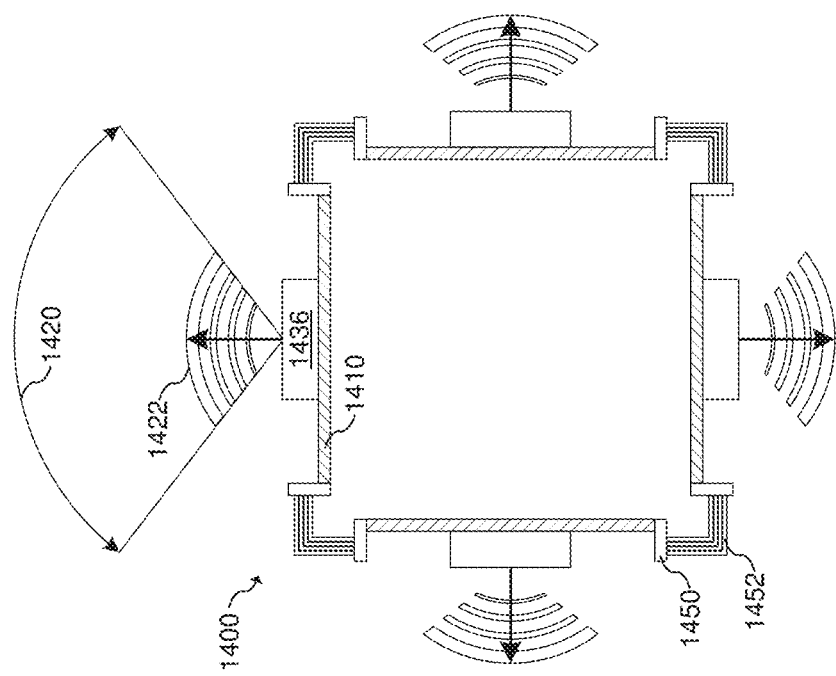
FIG. 14 illustrates an example radar system that has four planar substrates each including a radar subsystem disposed on respective planar surfaces of the four planar substrates, where the four planar substrates are arranged in a rectangular shape when viewed from a direction parallel to all respective planar surfaces in accordance with an embodiment of the invention.

FIG. 14 illustrates an example radar system that has four planar substrates each including a radar subsystem disposed on respective planar surfaces of the four planar substrates, where the four planar substrates are arranged in a rectangular shape when viewed from a direction parallel to all respective planar surfaces in accordance with an embodiment of the invention.

Referring to FIG. 14, a radar system 1400 includes four planar substrates 1410 each including a radar subsystem 1436 disposed on a respective planar surface of the four planar substrates 1410. Each of the planar substrates 1410 may be any suitable substrate and may be similar in composition to substrate 210 of FIG. 2. The radar subsystems 1436 are configured to transmit and receive RF signals 1422 corresponding to individual fields of view 1420 so that the radar system 1400 has a 360° combined field of view in a region surrounding the radar system 1400.

Each of the planar substrates 1410 is connected to two adjacent planar substrates 1410 using interfaces 1450 and flexible connectors 1452. The flexible connectors 1452 are adhesive tape in one embodiment. In other embodiments, the flexible connectors 1452 incorporate electrical connectivity and are ribbon cables or other suitable cables.

As shown in FIG. 14, the planar substrates 1410 are arranged in a rectangular shape when viewed from a direction that is parallel to the planar surfaces of the planar substrates 1410. In one embodiment, the rectangular shape is a square. In alternative embodiments, the rectangular shape may be any four-sided polygon. In some embodiments, a support structure may be included in the hollow region formed by the four planar substrates 1410 to improve the rigidity of the radar system 1400. It is also conceivable that additional planar substrates may be incorporated to form a cuboidal three-dimensional radar system.

Figure 15:
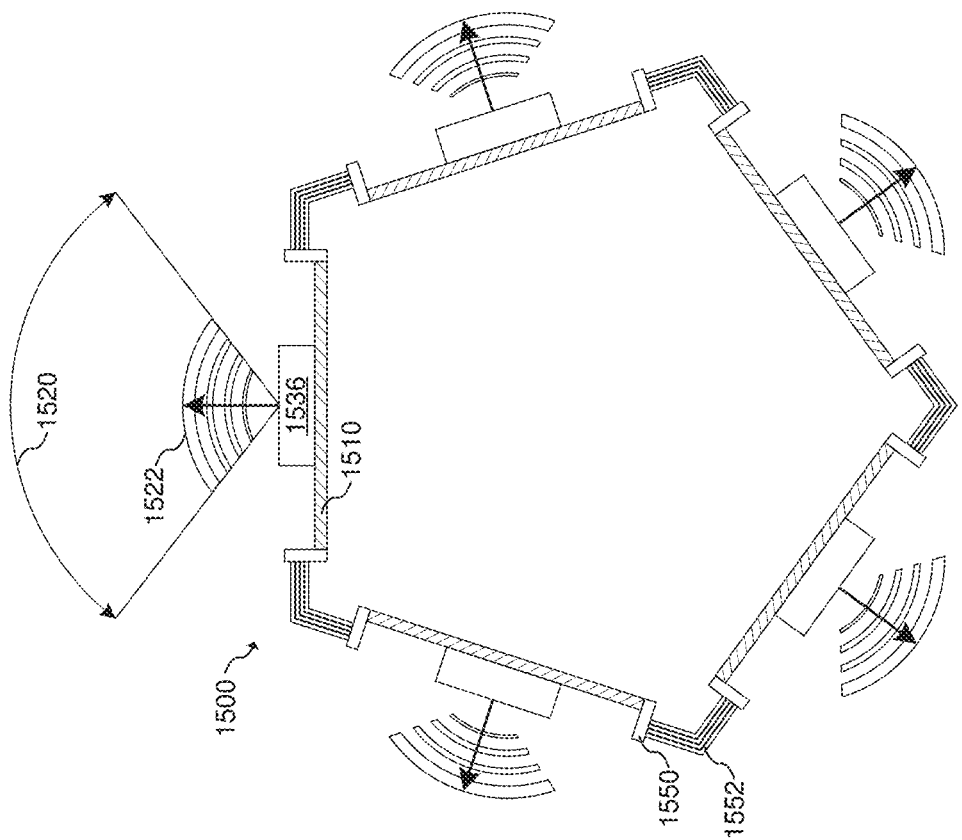
FIG. 15 illustrates an example radar system that has five planar substrates each including a radar subsystem disposed on respective planar surfaces of the five planar substrates, where the five planar substrates are arranged in a pentagonal shape when viewed from a direction parallel to all respective planar surfaces in accordance with an embodiment of the invention.

FIG. 15 illustrates an example radar system that has five planar substrates each including a radar subsystem disposed on respective planar surfaces of the five planar substrates, where the five planar substrates are arranged in a pentagonal shape when viewed from a direction parallel to all respective planar surfaces in accordance with an embodiment of the invention.

Referring to FIG. 15, a radar system 1500 includes five planar substrates 1510 each including a radar subsystem 1536 disposed on respective planar surfaces of the five planar substrates 1510 and each configured to transmit and receive RF signals 1522 corresponding to individual fields of view 1520. Each of the planar substrates 1510 may be any suitable substrate and may be similar in composition to substrate 210 of FIG. 2. Each of the planar substrates 1510 is connected to adjacent planar substrates 1510 similar to planar substrates 1410 of FIG. 14. The radar system 1500 has a 360° combined field of view in a region surrounding the radar system 1500.

Figure 16:
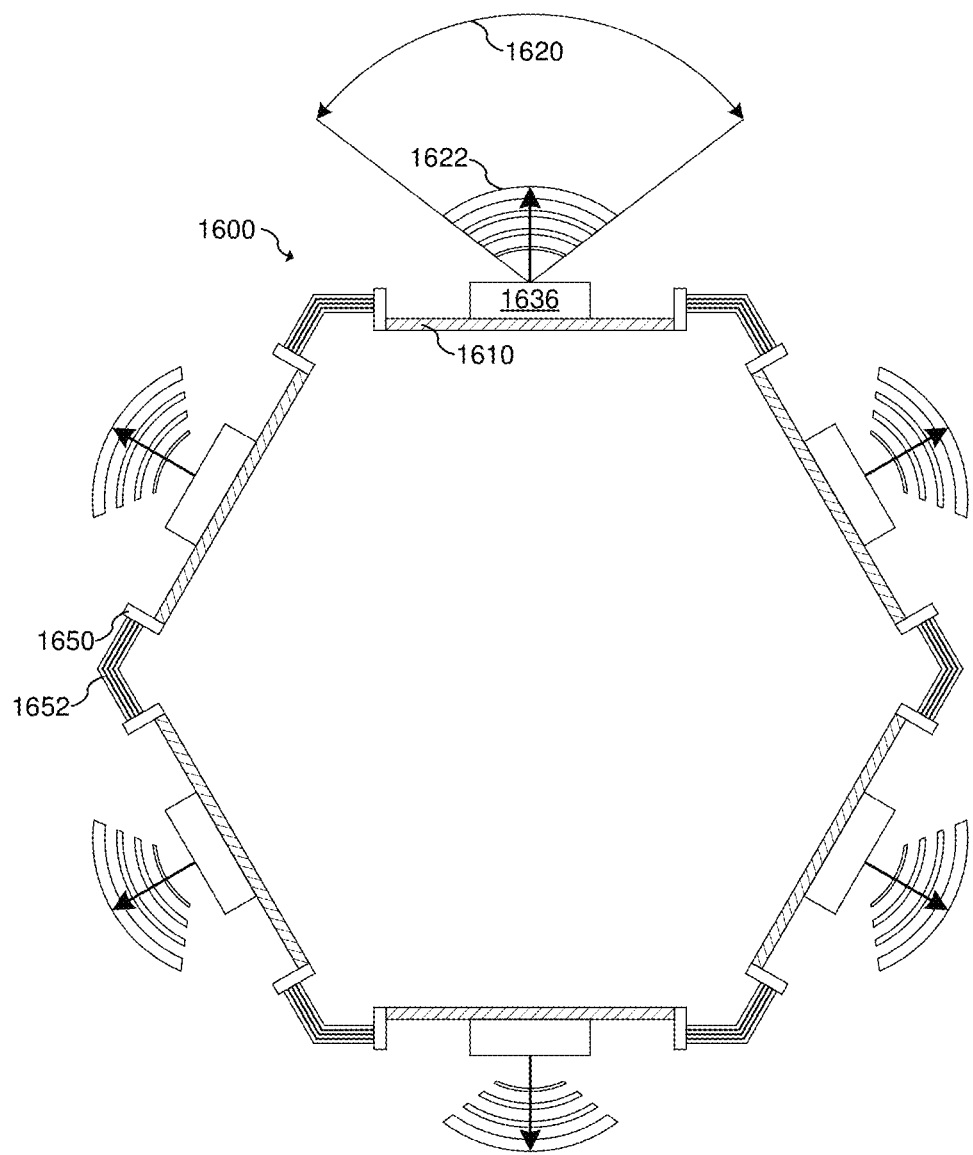
FIG. 16 illustrates an example radar system that has six planar substrates each including a radar subsystem disposed on respective planar surfaces of the six planar substrates, where the six planar substrates are arranged in a hexagonal shape when viewed from a direction parallel to all respective planar surfaces in accordance with an embodiment of the invention.

FIG. 16 illustrates an example radar system that has six planar substrates each including a radar subsystem disposed on respective planar surfaces of the six planar substrates, where the six planar substrates are arranged in a hexagonal shape when viewed from a direction parallel to all respective planar surfaces in accordance with an embodiment of the invention.

Referring to FIG. 15, a radar system 1500 includes six planar substrates 1610 each including a radar subsystem 1636 disposed on respective planar surfaces of the six planar substrates 1610 and each configured to transmit and receive RF signals 1622 corresponding to individual fields of view 1620. Each of the planar substrates 1610 may be any suitable substrate and may be similar in composition to substrate 210 of FIG. 2. Each of the planar substrates 1610 is connected to adjacent planar substrates 1610 similar to planar substrates 1410 of FIG. 14. The radar system 1600 has a 360° combined field of view in a region surrounding the radar system 1600.

Figure 17:
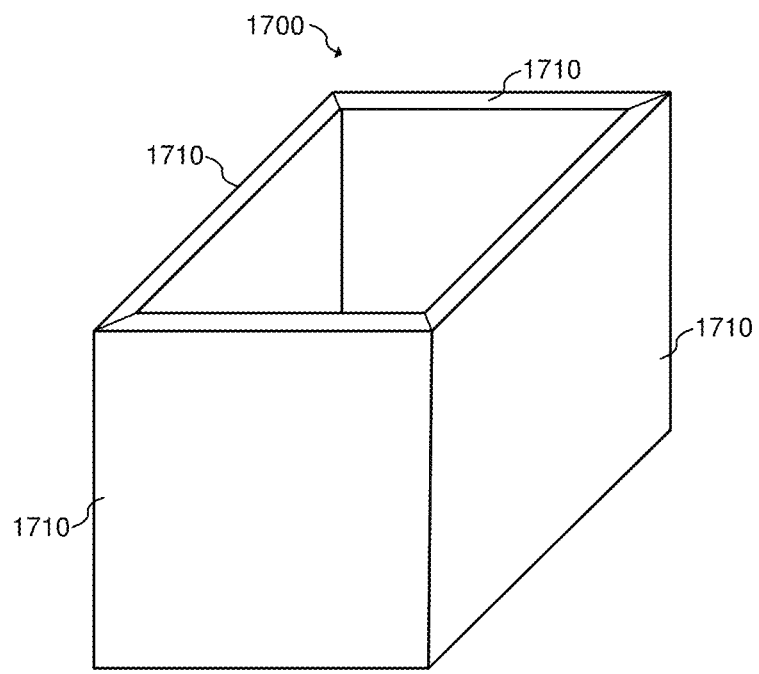
FIG. 17 illustrates an example radar system implemented in the shape of a polygonal prism in accordance with an embodiment of the invention.

FIG. 17 illustrates an example radar system implemented in the shape of a polygonal prism in accordance with an embodiment of the invention.

Referring to FIG. 17, a radar system 1700 includes four planar substrates 1710 arranged such that each of the planar substrates 1710 are on the surface of a polygonal prism. As shown in FIG. 17, the polygonal prism may be a rectangular prism in one embodiment. In other embodiments, radar system 1700 may include more or fewer planar substrates 1710 and be shaped as a triangular prism, pentagonal prism, hexagonal prism, and the like. The radar system 1700 may be a perspective view of radar system 1400 as illustrated in FIG. 14, for example. The planar substrates 1710 may each include various elements similar to the planar substrates as described in other embodiments, such as in those illustrated in FIGS. 14-16.

Figure 18:
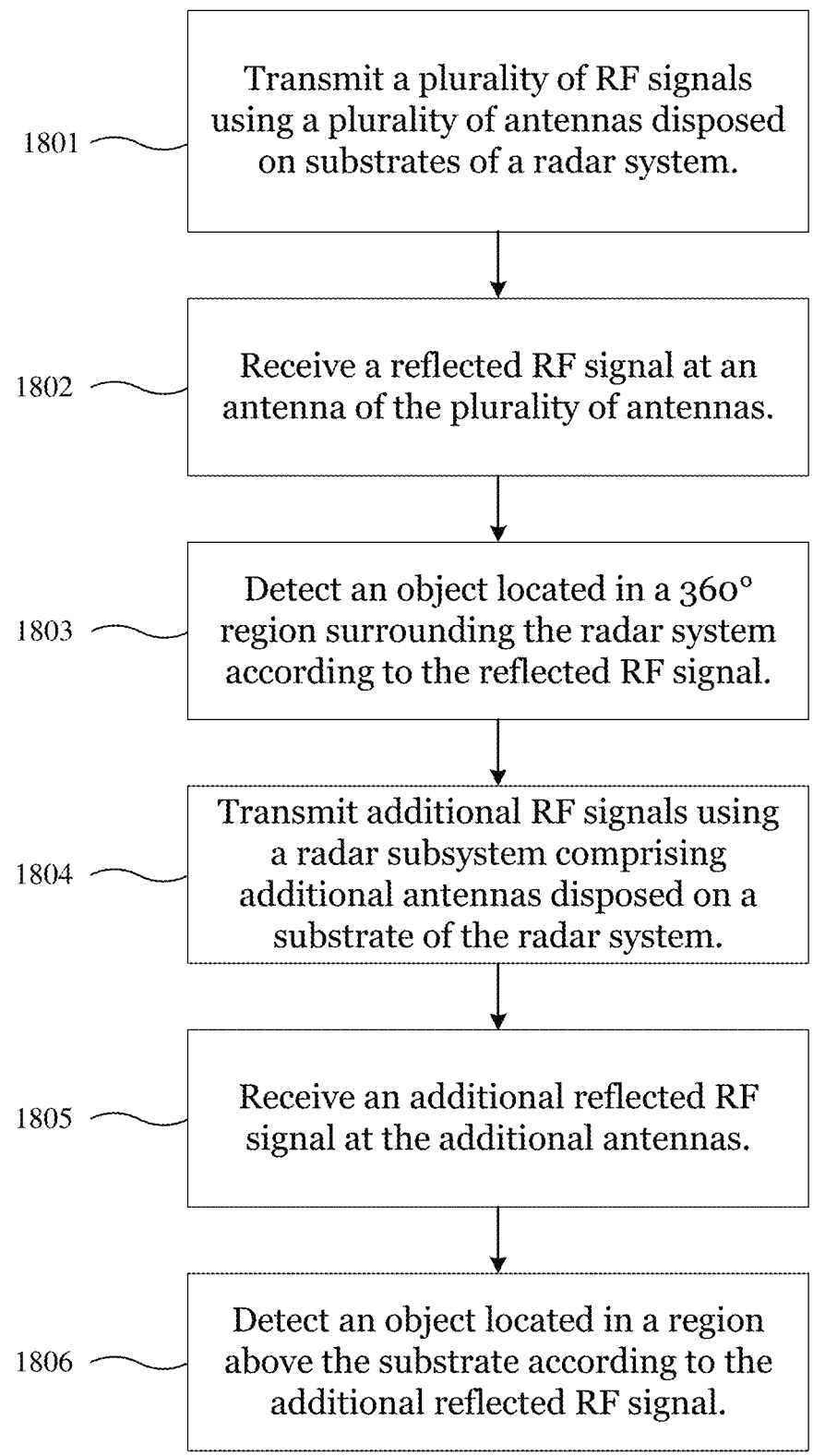
FIG. 18 illustrates a method of operating a radar system in accordance with an embodiment of the invention.

FIG. 18 illustrates a method of operating a radar system in accordance with an embodiment of the invention.

Step 1801 of operating the radar system includes transmitting a plurality of RF signals. The RF signals are transmitted by a plurality of antennas disposed on one or more substrates of the radar system. In one embodiment, the antennas are directional antennas which transmit and receive RF signals in a specific direction. In various embodiments, the antennas are disposed on a single substrate, and are disposed on a single planar surface of a substrate in one embodiment. The antennas may be configured as receivers, transmitters, or transceivers depending on desired functionality. In some embodiments, a subset of the antennas may be configured as transmitters to transmit the plurality of RF signals while a different subset of the antennas may be configured as receivers to receive RF signals.

The plurality of antennas of the radar system may be grouped into multiple radar subsystems. Each radar subsystem may include one or more of the antennas and an RFIC chip coupled to the antennas. The RFIC chip may include RF circuitry configured to process transmitted and received RF signals.

Each of the antennas is in a fixed orientation and position on a respective substrate. Additionally, the substrates of the radar system and the radar system in its entirety are in a fixed orientation and position during the transmitting of the RF signals. Each of the antennas has an individual field of view that is less than 360°. The field of view of an antenna may also be referred to as the coverage of the antennas and is also less than 360°. The combined coverage of the transmitted RF signals completely covers a 360° region surrounding the radar system.

In some embodiments, each of the RF signals has a primary lobe that is parallel to a single plane. This may enable the radar system to have the 360° field of view in a single plane in the region surrounding the radar system. In one embodiment, each of the RF signals has a primary lobe that is parallel to the plane of the antenna that transmitted the RF signal. In other embodiments, some or all of the primary lobes of the RF signals have component that is perpendicular to the plane of the antenna that transmitted the RF signal.

An optional step of operating the radar system includes increasing the directionality of the RF signals using a conductive plate disposed in proximity to the antennas of the radar system. For example, the antennas may be disposed on a planar surface of a substrate and a conductive plate may be positioned a specific distance above or below the substrate.

Step 1802 of operating the radar system includes receiving a reflected RF signal. The reflected RF signal is received by an antenna of the plurality of antennas. More than one antenna may receive the reflected RF signal. In some cases, the transmitted RF signals may result in multiple reflected signals which may be received by various antennas of the radar system.

Step 1803 of operating the radar system includes detecting an object located in the 360° region surrounding the radar system. The objected is detected by RF circuitry according to the reflected RF signal. For example, the RF circuitry may process the reflected RF signal and determine a position in three-dimensional space of an object according to the RF signal. The RF circuitry may be disposed on the same substrate as the antenna that received the reflected RF signal or may be disposed on a different substrate.

An optional step of operating the radar system includes processing the reflected RF signal to generate an input signal for a digital media module of the radar system. The RF circuitry may be configured to process the reflected RF signal and generate the input signal. The digital media module may be coupled to the RF circuitry. The input signal may be sent to the digital media module via the coupling and the digital media module may interpret the input signal as input commands for controlling functionality of the digital media module.

Step 1804 of operating the radar system includes transmitting one or more additional RF signals. The additional RF signals are transmitted by a radar subsystem disposed on a substrate of the radar system. The radar subsystem includes one or more additional antennas disposed on the one or more substrates of the radar system. Each of the additional antennas is in a fixed orientation and position. In one embodiment, the additional antennas are directional antennas. In one embodiment, each of the additional antennas is configured to have a broadside radiation pattern. In one embodiment, each of the additional RF signals includes a primary lobe that is directed away from the substrate. In other words, each of the additional RF signals may have a primary lobe that is perpendicular to the plane of the additional antenna that transmitted the additional RF signal. In some cases, a primary lobe of an additional RF signal may have a parallel component as well as a perpendicular component relative to the plane of the additional antenna that transmitted the additional RF signal.

Step 1805 of operating the radar system includes receiving an additional reflected RF signal. The additional reflected RF signal is received by the radar subsystem. The additional reflected RF signal may be received by one or more of the additional antennas of the radar subsystem.

Step 1806 of operating the radar system includes detecting an object located in a region above the radar subsystem and the substrate. The object located in a region above the radar subsystem and the substrate is detected according to the additional reflected RF signal and may be detected by the RF circuitry of step 1803 or by different RF circuitry of the radar system. For example, the radar subsystem may include additional RF circuitry disposed on the substrate. Alternatively, the plurality of antennas and the radar subsystem may be coupled to RF circuitry that processes both the reflected RF signal and the additional reflected RF signal in order to detect objects in the 360° region surrounding the radar system as well as objects in the region above the radar subsystem.

Example embodiments of the invention are summarized in the following. Other embodiments can also be understood from the entirety of the specification and the claims filed herein.

Example 1

A method of operating a radar system, the method including: transmitting, by a plurality of directional antennas, a plurality of transmitted radio frequency (RF) signals, where the plurality of directional antennas is disposed on a planar surface of a substrate, each of the plurality of antennas is in a fixed orientation and position on the planar surface, a respective individual coverage of each of the plurality of directional antennas is less than 360°, and a combined coverage of the plurality of transmitted RF signals completely covers a 360° region surrounding the radar system; and receiving, by a directional antenna of the plurality of directional antennas, a reflected RF signal.

Example 2

The method of example 1, further including detecting, by RF circuitry disposed on the substrate, an object located in the 360° region according to the reflected RF signal.

Example 3

The method of one of examples 1 and 2, further including transmitting, by a radar subsystem, one or more additional transmitted RF signals, where the radar subsystem includes one or more additional antennas disposed on the planar surface, each of the one or more additional antennas includes a broadside radiation pattern, each of the plurality of transmitted RF signals includes respective primary lobes directed parallel to the planar surface; each of the one or more additional transmitted RF signals include one or more additional primary lobes directed away from the planar surface, receiving, by the radar subsystem, an additional reflected RF signal; and detecting, by RF circuitry and according to the additional reflected RF signal, an object located in a region above the planar surface of the substrate, the RF circuitry being disposed on the substrate.

Example 4

The method of one of examples 1 to 3, where transmitting the plurality of transmitted RF signals includes transmitting the plurality of transmitted RF signals by a first subset of the plurality of directional antennas each configured as RF transmitters, and receiving the reflected RF signal includes receiving the reflected RF signal by a directional antenna of a second subset of the plurality of directional antennas each configured as RF receivers.

Example 5

The method of one of examples 1 to 4, where transmitting the plurality of transmitted RF signals includes increasing a directionality of each of the plurality of transmitted RF signals along respective directions parallel to the planar surface using a conductive plate, the conductive plate being disposed above the substrate.

Example 6

The method of one of examples 1 to 5, where a first radar subsystem includes a first radio frequency integrated circuit (RFIC) chip coupled to a first subset of the plurality of directional antennas, and a second radar subsystem includes a second RFIC chip coupled to a second subset of the plurality of directional antennas.

Example 7

The method of one of examples 1 to 6, further including processing, by RF circuitry, the reflected RF signal to generate an input signal, the RF circuitry being disposed on the substrate and coupled to the plurality of directional antennas; sending the input signal to a digital media module attached to the substrate and coupled to the RF circuitry; and interpreting, by the digital media module, the input signal as input commands for controlling functionality of the digital media module.

Example 8

A radar system including: a substrate including a planar surface; and a plurality of directional antennas disposed on the planar surface, the plurality of directional antennas being configured to transmit a plurality of transmitted radio frequency (RF) signals and receive a reflected RF signal, where each of the plurality of directional antennas is in a fixed orientation and position on the planar surface, a respective individual coverage of each of the plurality of directional antennas is less than 360°, and a combined coverage of the plurality of transmitted RF signals completely covers a 360° region surrounding the radar system.

Example 9

The radar system of example 8, further including: RF circuitry disposed on the substrate, the RF circuitry being configured to detect an object in the 360° region according to the reflected RF signal.

Example 10

The radar system of one of examples 8 and 9, further including: a radar subsystem disposed on the planar surface, the radar subsystem being configured to transmit one or more additional transmitted RF signals and receive an additional reflected RF signal, where the radar subsystem includes one or more additional antennas disposed on the planar surface, each of the one or more additional antennas includes a broadside radiation pattern, each of the plurality of transmitted RF signals includes respective primary lobes directed parallel to the planar surface, each of the one or more additional transmitted RF signals includes one or more additional primary lobes directed away from the planar surface; and RF circuitry disposed on the substrate, the RF circuitry being configured to detect an object located in a region above the planar surface of the substrate.

Example 11

The radar system of one of examples 8 to 10, where a first subset of the plurality of directional antennas is configured to function as RF transmitters and to transmit the plurality of transmitted RF signals, and a second subset of the plurality of directional antennas is configured to function as RF receivers and to receive the reflected RF signal.

Example 12

The radar system of one of examples 8 to 11, further including: a conductive plate disposed above the substrate, the conductive plate being configured to increase a directionality of each of the plurality of transmitted RF signals along respective directions parallel to the planar surface.

Example 13

The radar system of one of examples 8 to 12, further including: a first radar subsystem including a first radio frequency integrated circuit (RFIC) chip coupled to a first subset of the plurality of directional antennas; and a second radar subsystem including a second RFIC chip coupled to a second subset of the plurality of directional antennas.

Example 14

The radar system of one of examples 8 to 13, further including: RF circuitry disposed on the substrate and coupled to the plurality of directional antennas, the RF circuitry being configured to process the reflected RF signal to generate an input signal; and digital media module attached to the substrate and coupled to the RF circuitry, the digital media module being configured interpret the input signal, sent to the digital media module, as input commands for controlling functionality of the digital media module.

Example 15

A radar system including: a support structure; and a plurality of directional antennas disposed in fixed orientations and positions on outer surfaces of the support structure, the plurality of directional antennas being configured to transmit a plurality of transmitted radio frequency (RF) signals and receive a reflected RF signal, where each of the plurality of directional antennas includes a broadside radiation pattern, a respective individual coverage of each of the plurality of directional antennas is less than 360°, and a combined coverage of the plurality of a combined coverage of the plurality of transmitted RF signals completely covers a 360° region surrounding the radar system.

Example 16

The radar system of example 15, where the support structure includes a three-dimensional (3D) substrate formed of a solid piece.

Example 17

The radar system of example 16, where the 3D substrate formed of a solid piece is an elliptical cylinder, and where each of the plurality of directional antennas is disposed on a curved outer surface of the elliptical cylinder.

Example 18

The radar system of example 16, where the 3D substrate formed of a solid piece is a polygonal prism, and where each of the plurality of directional antennas is disposed on a planar outer surface of the polygonal prism.

Example 19

The radar system of example 15, where the support structure includes a plurality of planar substrates, the plurality of directional antennas is disposed on the plurality of planar substrates, and each of the plurality of planar substrates is connected to two adjacent planar substrates of the plurality of planar substrates so that each of the plurality of planar substrates is disposed along a respective side of a polygonal prism.

Example 20

The radar system of example 19, where each of the plurality of planar substrates is connected to two adjacent planar substrates by adhesive tape.

It should be noted that the designations of "top" and "bottom" in reference to features of the invention are merely convenient labels and do not necessarily reflect the orientation of the features in all embodiments. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method of operating a radar system, the method comprising:
    transmitting a plurality of transmitted radio frequency (RF) signals by a plurality of dedicated transmitters of a plurality of radar subsystems, wherein
    each of the plurality of radar subsystems comprises a dedicated transmitter of the plurality of dedicated transmitters,
a dedicated receiver of a plurality of dedicated receivers, and
a radio frequency integrated circuit (RFIC) chip comprising radar circuitry coupled to a transmitter front-end circuit and a receiver front-end circuit, the transmitter front-end circuit being coupled to the dedicated transmitter and the receiver front-end circuit being coupled to the dedicated receiver,
each of the plurality of dedicated transmitters is implemented as a directional antenna,
each of the plurality of dedicated receivers is implemented as a directional antenna,
all of the plurality of radar subsystems are disposed on a planar surface of a single substrate,
each of the plurality of dedicated transmitters is in a fixed orientation and position on the planar surface,
a respective individual coverage of each of the plurality of transmitted RF signals is less than 360°, and
a combined coverage of the plurality of transmitted RF signals completely covers a 360° region surrounding the radar system;
receiving, by a dedicated receiver of the plurality of dedicated receivers, a reflected RF signal; and
detecting an object located in the 360° region according to the reflected RF signal using RF processing circuitry common to the plurality of radar subsystems to process the reflected RF signal, the RF processing circuitry being disposed on the single substrate and coupled to each respective radar circuitry of the plurality of radar subsystems.

2. The method of claim 1, further comprising:
transmitting, by an additional radar subsystem, a plurality of additional transmitted RF signals, wherein
the additional radar subsystem comprises a plurality of additional antennas configured as an array disposed on the planar surface,
each of the plurality of additional antennas comprises a broadside radiation pattern,
each of the plurality of transmitted RF signals comprises respective primary lobes directed parallel to the planar surface,
each of the plurality of additional transmitted RF signals comprises one or more additional primary lobes directed away from the planar surface;
receiving, by the additional radar subsystem, an additional reflected RF signal; and
detecting, by the RF processing circuitry and according to the additional reflected RF signal, an object located in a region above the planar surface of the single substrate, the RF processing circuitry being disposed on the single substrate.

3. The method of claim 2, wherein:
the object located in the 360° region is a user of a digital media device comprising the radar system; and
detecting the object located in the region above the planar surface comprises detecting a gesture of the user in the region above the planar surface.

4. The method of claim 2, wherein:
the plurality of radar subsystems are configured to operate at 24 GHz, and
the additional radar subsystem is configured to operate at 60 GHz.

5. The method of claim 1, wherein transmitting the plurality of transmitted RF signals comprises increasing a directionality of each of the plurality of transmitted RF signals along respective directions parallel to the planar surface using a conductive plate, the conductive plate being disposed above the single substrate.

6. The method of claim 1, further comprising:
processing, by the RF processing circuitry, the reflected RF signal to generate an input signal, the RF processing circuitry being disposed on the single substrate and coupled to the plurality of dedicated receivers;
sending the input signal to a digital media module attached to the single substrate and coupled to the RF processing circuitry; and
interpreting, by the digital media module, the input signal as input commands for controlling functionality of the digital media module.

7. The method of claim 1, wherein:
each of the plurality of transmitted RF signals comprises respective primary lobes directed parallel to the planar surface; and
each of the dedicated transmitters is an end-fire directional planar antenna.

8. The method of claim 1, wherein:
the plurality of radar subsystems comprises a first radar subsystem and a second radar subsystem;
the first radar subsystem comprises a multiple dedicated transmitters of the plurality of dedicated transmitters; and
the second radar subsystem comprises exactly one dedicated transmitter of the plurality of dedicated transmitters.

9. A radar system comprising:
a single substrate comprising a planar surface; and
a plurality of dedicated transmitters, each implemented as a directional antenna disposed on the planar surface of the single substrate, the plurality of dedicated transmitters being configured to transmit a plurality of transmitted radio frequency (RF) signals;
a plurality of dedicated receivers, each implemented as a directional antenna disposed on the planar surface of the single substrate, the plurality of dedicated receivers being configured to receive a reflected RF signal;
a plurality of radar subsystems, each comprising
a dedicated transmitter of the plurality of dedicated transmitters,
a dedicated receiver of the plurality of dedicated receivers, and
a radio frequency integrated circuit (RFIC) chip comprising radar circuitry coupled to a transmitter front-end circuit and a receiver front-end circuit, the transmitter front-end circuit being coupled to the dedicated transmitter and the receiver front-end circuit being coupled to the dedicated receiver;
RF processing circuitry common to the plurality of radar subsystems disposed on the single substrate, the RF processing circuitry being coupled to each respective radar circuitry of the plurality of radar subsystems and configured to detect an object in a 360° region according to the reflected RF signal by processing the reflected RF signal;
wherein all of the plurality of radar subsystems are disposed on the planar surface of the single substrate;
wherein each of the plurality of dedicated transmitters is in a fixed orientation and position on the planar surface;
wherein a respective individual coverage of each of the plurality of transmitted RF signals is less than 360°; and wherein a combined coverage of the plurality of transmitted RF signals completely covers the 360° region surrounding the radar system.

10. The radar system of claim 9, further comprising:
an additional radar subsystem disposed on the planar surface, the additional radar subsystem being configured to transmit a plurality of additional transmitted RF signals and receive an additional reflected RF signal, wherein
 the additional radar subsystem comprises a plurality of additional antennas configured as an array disposed on the planar surface,
 each of the plurality of additional antennas comprises a broadside radiation pattern,
 each of the plurality of transmitted RF signals comprises respective primary lobes directed parallel to the planar surface,
 each of the plurality of additional transmitted RF signals comprises one or more additional primary lobes directed away from the planar surface; and
additional RF processing circuitry disposed on the single substrate, the additional RF processing circuitry being configured to detect an object located in a region above the planar surface of the single substrate.

11. The radar system of claim 10, wherein the additional radar subsystem is disposed at the center of the planar surface of the single substrate.

12. The radar system of claim 10, further comprising:
a conductive plate disposed above the single substrate, the conductive plate being configured to increase a directionality of each of the plurality of transmitted RF signals along respective directions parallel to the planar surface; and
wherein the conductive plate comprises a hole directly above the additional radar subsystem, the hole being configured to allow the additional transmitted RF signals and the additional reflected RF signal to pass through the conductive plate.

13. The radar system of claim 10, wherein:
the plurality of radar subsystems are configured to operate at 24 GHz, and
the additional radar subsystem is configured to operate at 60 GHz.

14. The radar system of claim 9, further comprising:
a conductive plate disposed above the single substrate, the conductive plate being configured to increase a directionality of each of the plurality of transmitted RF signals along respective directions parallel to the planar surface.

15. The radar system of claim 9, further comprising:
digital media module attached to the single substrate and coupled to the RF processing circuitry, the digital media module being configured interpret an input signal, sent to the digital media module, as input commands for controlling functionality of the digital media module; and
wherein the RF processing circuitry is further configured to process the reflected RF signal to generate the input signal.

16. The radar system of claim 9, wherein:
each of the plurality of transmitted RF signals comprises respective primary lobes directed parallel to the planar surface; and
each of the dedicated transmitters is an end-fire directional planar antenna.

17. The radar system of claim 9, wherein:
the plurality of radar subsystems comprises a first radar subsystem and a second radar subsystem;
the first radar subsystem comprises a multiple dedicated transmitters of the plurality of dedicated transmitters; and
the second radar subsystem comprises exactly one dedicated transmitter of the plurality of dedicated transmitters.

18. A radar system comprising:
a support structure; and
a plurality of directional antennas disposed in fixed orientations and positions on outer surfaces of the support structure, the plurality of directional antennas being configured to transmit a plurality of transmitted radio frequency (RF) signals and receive a reflected RF signal, wherein
 each of the plurality of directional antennas comprises a broadside radiation pattern,
 a respective individual coverage of each of the plurality of directional antennas is less than 360°,
 a combined coverage of the plurality of transmitted RF signals completely covers a 360° region surrounding the radar system,
 the support structure comprises a plurality of planar substrates,
 the plurality of directional antennas is disposed on the plurality of planar substrates, and
 each of the plurality of planar substrates is connected to two adjacent planar substrates of the plurality of planar substrates so that each of the plurality of planar substrates is disposed along a respective side of a polygonal prism.

19. The radar system of claim 18, wherein each of the plurality of planar substrates is connected to two adjacent planar substrates by adhesive tape.

* * * * *